(12) United States Patent
Levitt

(10) Patent No.: US 9,905,240 B2
(45) Date of Patent: Feb. 27, 2018

(54) SYSTEMS, METHODS, AND DEVICES FOR INTELLIGENT SPEECH RECOGNITION AND PROCESSING

(71) Applicant: Audimax LLC, New York, NY (US)

(72) Inventor: Harry Levitt, Bodega Bay, CA (US)

(73) Assignee: AUDIMAX, LLC, New York, NY (US)

( * ) Notice: Subject to any disclaimer, the term of this patent is extended or adjusted under 35 U.S.C. 154(b) by 0 days.

(21) Appl. No.: 14/886,714

(22) Filed: Oct. 19, 2015

(65) Prior Publication Data
US 2016/0111111 A1    Apr. 21, 2016

Related U.S. Application Data

(60) Provisional application No. 62/066,154, filed on Oct. 20, 2014.

(51) Int. Cl.
*G10L 21/003* (2013.01)
*G10L 21/02* (2013.01)
*G10L 21/057* (2013.01)
*G10L 15/24* (2013.01)

(52) U.S. Cl.
CPC ............ *G10L 21/003* (2013.01); *G10L 15/24* (2013.01); *G10L 21/02* (2013.01); *G10L 21/057* (2013.01)

(58) Field of Classification Search
CPC .................................................. G10L 21/003
USPC ........................................................ 704/231
See application file for complete search history.

(56) References Cited

U.S. PATENT DOCUMENTS

| | | | | |
|---|---|---|---|---|
| 8,433,568 B2 * | 4/2013 | Krause | ................... | G10L 25/48 704/237 |
| 8,589,166 B2 * | 11/2013 | Zopf | ...................... | G10L 19/16 370/270 |
| 9,553,984 B2 * | 1/2017 | Krause | ................... | A61N 1/08 |
| 2005/0246170 A1 | 11/2005 | Vignoli et al. | | |
| 2006/0126859 A1 | 6/2006 | Eberling | | |
| 2009/0306971 A1 | 12/2009 | Kim et al. | | |
| 2010/0046777 A1 | 2/2010 | Ito et al. | | |
| 2010/0111338 A1 | 5/2010 | Ypma et al. | | |
| 2011/0235813 A1 | 9/2011 | Gauger, Jr. | | |

(Continued)

FOREIGN PATENT DOCUMENTS

WO    2013018092 A1    2/2013

OTHER PUBLICATIONS

Allen, J. B., Berkley, D. A. and Blauert, J. Multimicrophone signal-processing technique to remove room reverberation from speech signals. J. Acoust. Soc. Am., 62, 912-915, 1977.

(Continued)

*Primary Examiner* — Susan McFadden
(74) *Attorney, Agent, or Firm* — Hunton & Williams LLP

(57) ABSTRACT

Systems, methods, and devices for intelligent speech recognition and processing are disclosed. According to one embodiment, a method for improving intelligibility of a speech signal may include (1) at least one processor receiving an incoming speech signal comprising a plurality of sound elements; (2) the at least one processor recognizing a sound element in the incoming speech signal to improve the intelligibility thereof; (3) the at least one processor processing the sound element by at least one of modifying and replacing the sound element; and (4) the at least one processor outputting the processed speech signal comprising the processed sound element.

41 Claims, 10 Drawing Sheets

(56) References Cited

U.S. PATENT DOCUMENTS

2013/0156202 A1    6/2013    Hamacher et al.
2014/0142947 A1    5/2014    King et al.

OTHER PUBLICATIONS

Boothroyd, A., Hnath-Chisolm, T., Hanin, L. and Kishon-Rabin, L. Voice fundamental frequency as an auditory supplement to the speechreading of sentences. Ear Hear., 9, 306-12, 1988.

Cox, R. M. and Alexander, G. C. The abbreviated profile of hearing aid benefit. Ear Hear., 16, 176-86, 1995.

Dillon, H., James, A. and Ginis, J. Client Oriented Scale of Improvement (COSI) and its relationship to several other measures of benefit and satisfaction provided by hearing aids. J Am Acad Audiol. 8, 27-4, 1997.

Hanin, L., Boothroyd, A. and Hnath-Chisolm, T. Tactile presentation of voice fundamental frequency as an aid to the speechreading of sentences. Ear Hear. 9, 335-41, 1988.

Hnath-Chisolm, T. and Kishon-Rabin, L. Tactile presentation of voice fundamental frequency as an aid to the perception of speech pattern contrasts. Ear Hear., 9, 329-34, 1988.

Humes, L. E., Dirks, D. D., Bell, T. S., Ahlstbom, C. and Kincaid, G. E. Application of the Articulation Index and the Speech Transmission Index to the Recognition of Speech by Normal-Hearing and Hearing-Impaired Listeners. J. Speech, Lang. & Hear. Res., 29, 447-462, 1986.

Nilsson, M., Soli, S. D. and Sullivan, J. A. Development of the Hearing in Noise Test for the measurement of speech reception thresholds in quiet and in noise. J Acoust Soc Am., 95, 1085-99, 1994.

Peterson, P. M., Durlach, N. I., Rabinowitz, W. M. and Zurek, P. Multimicrophone adaptive beamforming for interference reduction in hearing aids, J. Rehabil. Res. Dev., 24, 103-110, 1987.

Picheny, M. A, Durlach, N. I and Braida, L. D., Speaking clearly for the hard of hearing I: Intelligibility differences between clear and conversational speech. J Speech, Lang. & Hear. Res., 28, 96-103, 1985.

Picheny, M. A, Durlach, N. I and Braida, L. D., Speaking clearly for the hard of hearing. II: Acoustic characteristics of clear and conversational speech. J Speech, Lang. & Hear. Res., 29, 434-46, 1986.

PCT Notification of Transmittal of the International Search Report and the Written Opinion of the International Searching Authority, or the Declaration, International Search Report dated Feb. 26, 2016, International Application No. US2015/056210.

\* cited by examiner

SYSTEMS, METHODS, AND DEVICES FOR INTELLIGENT SPEECH RECOGNITION AND PROCESSING

RELATED APPLICATIONS

This application is a continuation of U.S. Patent Application Ser. No. 62/066,154 filed Oct. 20, 2014, the disclosure of which is incorporated, by reference, in its entirety.

BACKGROUND OF THE INVENTION

1. Field of the Invention

The present application generally relates to electronic communications, and, more particularly, to communications systems, methods and devices having intelligent speech recognition and processing.

2. Description of the Related Art

Background noise, room reverberation, and signal distortions in modern communication systems (e.g., cellular telephones) destroy many important speech cues resulting in an impoverished speech signal. Speech, however, contains many redundant cues and it is possible for a person with normal hearing to use these redundancies to compensate for the loss of speech cues for most of the noisy, reverberant or other forms of distorted speech encountered in everyday life. This is not a fortuitous accident. Legislation, public pressure, and related factors have resulted in reduced background noise in the workplace, public places, schools, etc. so that speech communication is relatively efficient most of the time for people with normal hearing. A person with a hearing loss, however, has to deal with two forms of impoverished speech, the loss of speech cues resulting from reduced neural processing of signals in the impaired auditory system, and the additional loss of speech cues in distorted speech. Whereas many people with hearing loss are able to understand undistorted speech in quiet using redundant speech cues to compensate for the loss of speech cues resulting from deficient neural processing in the impaired auditory system, distorted speech signals are substantially more difficult to understand. Amplification is useful for improving the intelligibility of undistorted speech in quiet in that it increases the audibility of many of the useful redundant cues in the impoverished speech signal. If, however, the amplified speech signal is distorted (e.g., background noise is amplified as well as the speech signal), there are substantially fewer remaining redundant speech cues to compensate for the combined loss of speech cues resulting from deficient neural processing in the impaired auditory system and the loss of speech cues in distorted speech signals. Seniors with a hearing loss also have age-related deficits in neural and cognitive processing, particularly with respect to processing rapid temporal changes. As a consequence, these seniors have substantially greater difficulty than young normal hearing adults understanding speech with the kinds of distortions commonly encountered in everyday life. Conventional amplification is of little benefit in improving the intelligibility of distorted speech, particularly speech with rapid temporal distortions.

The field of automatic speech recognition has made substantial progress in recent years. Machine recognition of speech is now a practical reality although not yet as efficient as human speech recognition. However, algorithms using the technology of automatic speech recognition have been developed to improve the intelligibility and quality of impoverished speech. The signal processing algorithms implemented in hearing aids, however, process the acoustic signal only. In contrast, automatic speech recognition algorithms use all of the information in the speech signal, which may include optic, phonetic, linguistic and/or statistical information. The many redundancies in the speech signal that enable understanding of impoverished speech are conveyed by both the acoustic and optic components of speech in face-to-face communication, particularly under challenging listening conditions.

SUMMARY OF THE INVENTION

Systems, methods and devices having intelligent speech recognition and processing are disclosed. In one embodiment, the systems, methods and devices may implement a Speech Recognition Aid (SRA), as described herein. The SRA may be implemented in a manner for improving the intelligibility and sound quality of speech for people with hearing loss including, in particular, seniors with hearing loss who almost invariably also have age-related deficits in neural and cognitive processing.

For example, a conventional hearing aid processes the acoustic signal without regard to the phonetic, linguistic, semantic or statistical content of speech signals. The processed acoustic signal is then delivered to the listener using audition only. Therefore, it is an objective of the invention to provide systems, methods and devices that may utilize all speech information reaching the listener by audition, vision, and, in special cases, taction, such as for blind people with hearing loss using the SRA with a tactile aid. The SRA delivers the processed speech signal to the listener in an appropriate format depending on the mode of communication (e.g., face-to-face conversation, watching television, listening to an audio recording).

It is a further objective of the invention to provide systems, methods and devices that may support improved, or intelligent, speech recognition for a large majority of people who are candidates for acoustic amplification (e.g., seniors). These candidates may experience age-related auditory processing deficits in neural and reduced cognitive processing in addition to a hearing loss. Accordingly, the SRA is designed to operate in a manner that may improve both intelligibility and sound quality of speech for people with hearing loss including seniors with age-related deficits in neural and cognitive processing.

There are large individual differences among people with hearing loss in the perception of speech depending on the nature and severity of the hearing loss and other complex variables. Thus, in yet another objective of the invention, the SRA may be implemented so that is may be trained to recognize those aspects of the speech signal that are not processed appropriately for each individual user. The SRA may then modify the speech signal for each user so as to improve its intelligibility and/or sound quality. Using this training paradigm, the SRA may also be used to improve speech intelligibility and/or sound quality for people with hearing loss as well as people with normal hearing for their age listening to impoverished speech. The impoverished speech may be a result of background noise, room reverberation, or speech received via a poor telephone or Internet connection subject to distortions unique to the method of signal of transmission. For example, a new form of distortion in modern speech communication systems is that of short-term dropouts in a cellular telephone link. These new forms of distortion are quite different from distortions encountered in everyday speech communication (background noise, room reverberation) and accordingly may require very different algorithms for improving speech intelligibility and/or sound quality. The SRA has the capability to recognize the nature of the distortion and which aspects of the speech signal are vulnerable to the distortion. By this means, the SRA may select automatically an appropriate signal processing algorithm for each type of distortion. In one embodiment, for example, the SRA may recognize a commonly encountered distortion as a result of the SRA being worn by the user over a period of time. The SRA identifies the speech cues that are likely to be lost to the user as a result of the distortion and selects an algorithm to compensate for the loss of these cues by enhancing these cues and/or other, redundant speech cues less likely affected by the distortion. This form of speech processing draws on the physical, phonetic, linguistic and statistical properties of the speech signal and the auditory capabilities of the hearing impaired user. The SRA is uniquely well suited for processing speech in this way to improve speech intelligibility and/or sound quality for distortions commonly encountered by each user. The SRA also has the capability of recognizing and compensating for new forms of distortion that may be introduced in the future and with time may become commonplace, as has been the case with distortions of the type introduced by cellular telephones. It should be noted that the SRA may be trained to recognize and categorize each distortion in terms of which speech cues are lost, which cues are reduced or altered and can be adjusted, and which remaining, redundant speech cues can be emphasized to compensate for the lost, reduced or altered cues. Once the distortion is recognized in these terms, the physical characteristics of the distortion are then determined. In this way the SRA can be trained to recognize and categorize at the speech feature level any distortion that may be introduced in the future In particular, the systems, methods and devices which implement the SRA differ from a conventional hearing aid or cellular phone with signal-enhancing features in several respects. The SRA may operate to use phonetic, linguistic and statistical information in analyzing the physical signals reaching the listener. In another respect, the SRA may operate to analyze physical signals consisting of both acoustic and optic signals, as used by humans in face-to-face communication or using Internet-based audio-video links such as Skype™. Lastly, the SRA may operate to deliver speech to the listener, which is not limited to audition, but can include vision and taction as well. Although not widely used, taction has been used to deliver speech cues to profoundly deaf and deaf-blind people for over a century.

In a particular embodiment, the SRA may operate in a non-speech recognition mode. In the non-speech recognition mode, the SRA may operate to provide conventional hearing aid functions (e.g., listening to music, alerting signals, and other non-speech sounds). Additionally, this mode of operation may process audio signals, and further analyze acoustic signals.

In another embodiment, the SRA may operate in a speech recognition mode. In the speech recognition mode, the SRA may operate to utilize all available speech information in the physical speech signal as well as information on how speech is produced and the phonetic, linguistic and statistical properties of the spoken language in order to recognize, process, and deliver speech to the listener so as to improve speech intelligibility and/or sound quality.

According to one embodiment, a method for improving intelligibility of a speech signal may include (1) at least one processor receiving an incoming speech signal comprising a plurality of sound elements; (2) the at least one processor recognizing a sound element in the incoming speech signal to improve the intelligibility thereof; (3) the at least one processor processing the sound element by at least one of modifying and replacing the sound element; and (4) the at least one processor outputting the processed speech signal comprising the processed sound element.

In one embodiment, the sound element comprises at least one of a continuant sound element and a non-continuant sound element.

In one embodiment, the processing increases a duration of the sound element.

In one embodiment, the processing decreases a duration of the sound element.

In one embodiment, the method may further include the at least one processor recognizing a second sound element in the incoming speech signal to improve the intelligibility thereof; and the at least one processor processing the second sound element by at least one of modifying and replacing the sound element. The second sound element may be modified or replaced to compensate for the processing of the first sound element.

In one embodiment, the sound element may be a speech sound.

In one embodiment, the first sound element may be a short continuant, and the second element may be a long continuant, and the processed speech signal that is output comprises the modified or replaced first and second sound elements In one embodiment, the method may further include the at least one processor further processing the incoming speech signal by modifying a duration of a pause in the incoming speech signal, and wherein the processed speech signal that is output comprises the modified pause.

In one embodiment, the method may further include reproducing the processed speech signal, and a rate at which the output processed speech is reproduced is decreased.

According to another embodiment, a method for improving intelligibility of a speech signal may include (1) at least one processor receiving an incoming speech signal; (2) the at least one processor identifying a voice fundamental frequency of the incoming speech signal; (3) the at least one processor processing the incoming speech signal by analyzing the speech signal to extract the periodic pitch pulses that stimulate the resonances of the vocal tract in voiced speech, the frequency of these periodic pitch pulses being the voiced fundamental frequency; (4) the at least one processor replacing the extracted periodic pitch pulses of the incoming speech signal with periodic pitch pulses that stimulate a wider frequency range of vocal tract resonances with a greater intensity; and (5) the at least one processor outputting the processed speech signal.

In one embodiment, the replacement periodic pluses may be approximate Dirac pulses.

In one embodiment, the method may further include the at least one processor further processing the incoming speech signal by generating a supplementary signal comprising the voice fundamental frequency; and the at least one processor outputting the supplementary signal by one of audition, taction, and vision.

In one embodiment, the sound element may be a speech sound.

According to another embodiment, a method for improving intelligibility of a speech signal may include (1) at least one processor receiving an audio signal comprising an incoming speech signal; (2) the at least one processor recognizing an acoustic environment for the audio signal; (3) the at least one processor recognizing a sound element in the received speech signal to improve the intelligibility thereof; (4) the at least one processor determining a signal processing strategy for processing the sound element based on the acoustic environment; (5) the at least one processor applying the determined signal processing strategy to the identified sound element; and (6) the at least one processor outputting a processed speech signal comprising the processed sound element.

In one embodiment, the method may further include the at least one processor determining that the acoustic environment reduces intelligibility of the speech signal.

In one embodiment, determining a signal processing strategy for processing the speech signal based on the reduced speech intelligibility listening condition may include the at least one computer processor altering the signal processing strategy based on feedback from the user. The feedback may be audible feedback from a user.

In one embodiment, the determined signal processing strategy reduces inter-segment masking.

In one embodiment, the determined signal processing strategy reduces reverberant masking.

In one embodiment, the determined signal processing strategy reduces background noise.

In one embodiment, the determined signal processing strategy reduces acoustic feedback.

In one embodiment, the sound element may be a speech sound.

In one embodiment, outputting a processed speech signal may include outputting a first portion of the processed speech signal to a first channel of an output, and outputting a second portion of the processed speech signal to a second channel of the output.

According to another embodiment, a communication device may include an input that receives an incoming speech signal that comprises a plurality of sound elements; at least one processor that recognizes a sound element in the incoming speech signal to improve the intelligibility thereof, and processes the sound element by at least one of modifying and replacing the sound element; and an output that outputs the processed speech signal comprising the processed sound element.

In one embodiment, the input may include a microphone.

In one embodiment, the output may include a speaker.

In one embodiment, the output may include a tactual transducer.

In one embodiment, the input, the at least one processor, and the output are co-located within the same device.

In one embodiment, the output and the at least one processor are separate.

In one embodiment, the sound element may be a speech sound.

According to another embodiment, a communication device may include an input that receives an audio signal, the audio signals comprising an incoming speech signal; at least one processor that performs the following: recognize an acoustic environment for the audio signal; recognize a sound element in the received speech signal to improve the intelligibility thereof; determine a signal processing strategy for processing the sound element based on the acoustic environment; and apply the determined signal processing strategy to the identified sound element; and an output that outputs a processed speech signal comprising the processed sound element.

In one embodiment, the at least one processor further determines that the acoustic environment reduces intelligibility of the speech signal In one embodiment, the input may be a microphone.

In one embodiment, the output may be a speaker.

In one embodiment, output may include a tactual transducer.

In one embodiment, the input, the at least one processor, and the output are co-located within the same device.

In one embodiment, the output and the at least one processor are separate.

In one embodiment, the sound element may be a speech sound.

According to another embodiment, a device for improving intelligibility of a speech signal may include an input that receives an incoming audio signal; a first output associated with a first user ear; a second output associated with a second user ear; and at least one processor that switches outputting the incoming audio signal between the first output and the second output.

In one embodiment, the switching may be quasi-periodic.

According to another embodiment, a device for improving intelligibility of a speech signal may include an input that receives an incoming audio signal; a first output associated with a first user ear; a second output associated with a second user ear; at least one processor that performs the following: recognize a first sound element in the incoming audio signal as a strong sound element; outputs the first sound element to the first output; receives a second sound element in the incoming audio signal; outputs the second sound element to the second output; recognize a third sound element in the incoming audio signal as a strong sound element; outputs the third sound element to the second output; receives a fourth sound element in the incoming audio signal; and outputs the fourth sound element to the first output.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1A:
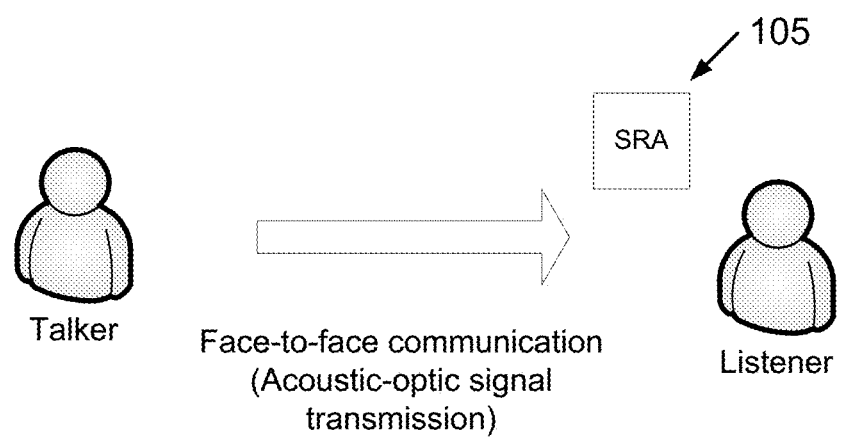
FIG. 1A depicts a system for intelligent speech recognition and processing according to one embodiment.

Several embodiments of the present invention and their advantages may be understood by referring to FIGS. 1-6.

As used here, the phrase "received speech signal" refers to the physical signal that reaches a listener. In face-to-face communication, the received speech signal has both an acoustic and an optic component. In telephone communication, the received speech signal generally consists of an acoustic signal only. For the special case of a blind person with a hearing loss, the received speech signal may consist of both acoustic and tactual speech cues from a vibrating device.

As used herein, the term Speech Recognition Aid, or SRA, refers to any device that functions as described herein. The SRA may be implemented in hardware, software, or a combination thereof. It may also be a stand-alone device worn on the ear as in a conventional hearing aid, or it may be split into two or more units. For example, it may consist of two units, a small, low-power ear-worn unit comparable in size to a conventional hearing aid and a pocket-worn unit of larger size capable of computationally intensive processing with relatively high power consumption. The ear-worn unit may have one or more microphones with preamplifiers, an audio output transducer and a link to a wearable video display. Tactual transducers may also be used to deliver signals to the user. The two units communicate with each other by means of hard-wired electrical links or electromagnetic links, such as telecoil links, Bluetooth links, or other radio links. The binaural version of the SRA has two ear-worn units, one on each ear. In another implementation, the larger unit may be connected to, or be part of, another device (e.g., a smartphone, tablet computer, etc.) that provides a link to the telephone network and/or the Internet. These links allow for communication via plain old telephones (POTS), mobile phones, Smart phones with additional signal processing capabilities, Internet-based communication devices (hardware and/or software), Skype™, or other communication devices, and other software applications executed by an electronic device, such as a node in a communication network, etc. Other implementations of a SRA are within the scope of this disclosure.

As used herein, the term "hearing loss" may include the effects of damage to the auditory system as well as age-related deficits in neural and cognitive processing. This broader definition of hearing loss is used since the majority of people with hearing loss are seniors with age-related deficits in neural and cognitive processing.

As disclosed herein, improving intelligibility of a speech signal may include improving the intelligibility of the speech signal and/or improving the sound quality of the speech signal.

Speech is produced by an energy source (the lungs) delivering acoustic energy to a sound transmission path (the vocal tract) which modifies the transmitted sound. The vocal tract typically has resonant frequencies depending on the shape of the vocal tract. These resonances, as measured using spectrum analysis are known as "formants."

There are three forms of energy generation in speech: i) Periodic Stimulation, in which are periodic bursts of air caused by vibrations of the vocal cords stimulate the resonances of the vocal tract; ii) Random Stimulation, in which random perturbations of air flow in the vocal tract produce noise-like sounds that are filtered by the resonances of the vocal tract; and iii) Pulsive Stimulation, which consists of single bursts of energy, such as those generated when a blockage of the vocal tract is suddenly released.

The sounds of speech may be divided into classes depending on the sound source. Vowels and diphthongs are produced by periodic vibrations of the vocal cords. These sounds are relatively long compared to consonants. The resonances of the vocal tract (formants) do not vary significantly during the steady state portion of vowels. There are formant transitions into and out of a vowel indicative of an adjacent consonant. Diphthongs begin with a formant pattern typical of a vowel which then merges into the formant pattern of a second vowel. Vowels and diphthong can be sub-classified according to the manner in which they are produced, such as front vowels, central vowels and back vowels produced by constrictions of the vocal tract at the front, center and back of the mouth respectively.

Sounds produced by random stimulation of the vocal tract are known as voiceless fricatives, such as /s/ in sip and /sh/ in ship. Voiced fricatives, such as /z/ in zip, combine random stimulation with periodic stimulation of the vocal tract.

The nasal consonants, such as /n/ in nip, are produced by periodic stimulation of the vocal tract, as in vowels, but the shape of the vocal tract is very different. The vocal tract is blocked, either at the lips or at the back of the mouth such that the acoustic signal exits the vocal tract via the nasal cavities. The shape of the vocal tract in nasal consonants is complex resulting in a complicated mix of resonances and anti-resonances. The nasal consonants also have most of their energy in the low frequencies.

The glide consonants are produced in the same way as vowels, but are of short duration with rapid formant transitions. The articulation of a glide begins with the vocal tract in the shape appropriate for one vowel and ends shortly after in the shape appropriate for another vowel.

The stop consonants, such as /p/ in pin and /b/ in bin, are produced by the sudden release of a constriction in the vocal tract. The stop consonants can be voiced or voiceless; e.g., /p/ is a voiceless stop produced by a constriction at the lips, while its cognate /b/ is a voiced stop produced by the same constriction at the lips. Articulation of a voiceless stop differs from that of a voiced stop in that the onset of voicing after release of the constriction is delayed. The stop consonants also include a burst of random stimulation referred to as a stop burst. The amount of energy in a stop burst varies widely. In some cases, such as a stop at the end of a word, the stop burst may be omitted entirely.

The sound classes described above may be divided into two broad categories, continuants and non-continuants. The continuants (vowels, diphthongs, fricatives, nasals, and a few special sounds such as /l/, as in lip, and /r/ as in rip) are ongoing sounds, the durations of which can be modified without changing the meaning of what is said. The non-continuants, glides, stops and affricates (a combination of stops and fricatives) are of fixed duration and cannot be modified in duration without altering meaning, except for minor modifications of the stop burst.

Speech sounds within each sound class may be subdivided into segments or elements which convey meaning, sometimes referred to phonemes. Different languages have different segment/element sets within each sound class, but there are many segments/elements that are common to multiple languages. Speech also has supra-segmental components that convey meaning, such as word stress and intonation for signaling questions, statements, emphasis.

Referring now to FIG. 1A, this figure depicts an embodiment of the SRA that may be used, for example, in face-to-face communication. In this embodiment, speech produced by a talker may be transmitted to the user of the SRA by means of acoustic and optic signals which are received by the SRA 105. The acoustic signals reaching the SRA 105 may be received by one or microphones which serve as the acoustic input to the SRA. The optic signals reaching the SRA 105 may be received by one or more wearable cameras which serve as the optic input to the SRA 105. The received acoustic and optic signals may be processed by the SRA 105 to improve the intelligibility and/or sound quality of the speech.

The output of the SRA 105 may include acoustic and/or optic signals and, in some cases, tactual signals. The acoustic signals may be delivered to the user by means of hearing aid output transducers, in-the-ear loudspeakers, earphones, or other acoustic transducers for delivering sound to the ear. The optic signals may be delivered to the user by means of video displays, head-worn optic displays, Google Glass, or other optic/video displays. The optic signals delivered to the user supplement the visual cues of the talker's face and body movements available in normal face-to-face communication. Vibrating devices and other tactual transducers may also be used to deliver speech cues to the user. The SRA may also be used without the use of optic or tactile supplements to the visual cues normally available in face-to-face communication.

Figure 1B:
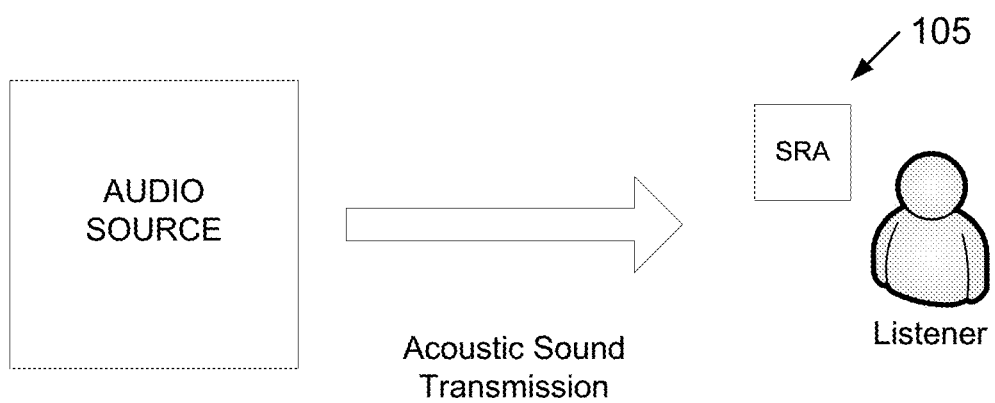
FIG. 1B depicts a system for intelligent speech recognition and processing according to another embodiment.

FIG. 1B depicts an embodiment of the SRA 105 in which an audio source may transmit acoustic speech signals which are received by the SRA 105. The audio source may be a radio, record player, audio cassette player, CD player, assistive listening device, voice over IP device, audio conferencing system, public address system, streaming radio device, two-way radios, or audio outputs of tablet computers, desktop and notebook computers, workstations, electronic reading devices, etc. The acoustic signals reaching the SRA may be received by one or more microphones which serve as the acoustic input to the SRA 105. The received acoustic signals may be processed by the SRA to improve the intelligibility and/or sound quality of the speech.

The output of the SRA 105 in FIG. 1B consists of acoustic signals that may be delivered to the user by means of hearing aid output transducers, in-the-ear loudspeakers, earphones, or other acoustic transducers for delivering sound to the ear. Speech cues extracted by the SRA 105 from the acoustic signal may also be delivered by visual stimuli delivered by means of video displays, head-worn optic displays, Google Glass, or other optic/video displays. Similarly, speech cues extracted by the SRA 105 from the acoustic signal may also be delivered by tactual stimuli delivered by means of vibrating devices and other tactual transducers. Speech cues delivered by this means supplement the visual speech cues normally available in face-to-face communication.

Whereas it may be recognized that supplemental speech cues delivered by visual or tactile means may be helpful to a person with a hearing loss, it is not widely recognized that supplemental visual cues delivered by this means may also be helpful to a person with normal hearing listening under difficult listening conditions, as in background noise, or in a highly reverberant environment or listening to distorted speech over a poor quality communication channel.

Figure 1C:
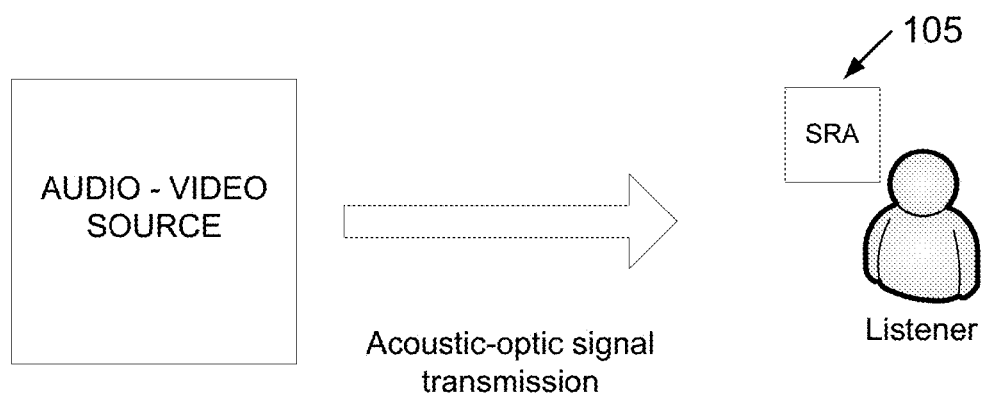
FIG. 1C depicts a system for intelligent speech recognition and processing according to another embodiment.

FIG. 1C depicts an embodiment of the SRA 105 in which an audio-video source may transmit acoustic and optic signals that are received by the SRA 105. The audio-video source may be a television set, DVD player, video-cassette player, movie in a theater, home movie, video conferencing system, or audio-video outputs of a tablet computer, desktop and notebook computer, or workstation, etc. The acoustic signals reaching the SRA 105 may be received by one or microphones which serve as the acoustic input to the SRA 105. The optic signals reaching the SRA 105 may be received by one or more cameras which serve as the optic input to the SRA 105. The received acoustic and optic signals may be processed by the SRA 105 to improve the intelligibility and/or sound quality of the speech.

The output of the SRA 105 in FIG. 1C may consist of acoustic, electric, and/or optic signals. The acoustic signals may be delivered to the user by means of hearing aid output transducers, in-the-ear loudspeakers, earphones, or other acoustic transducers for delivering sound to the ear. The optic signals may be delivered to the user by means of video displays, head-worn optic displays, Google Glass, or other optic/video displays. Vibrating devices and other tactual transducers may also be used to deliver signals to the user. The SRA may also be used without the use of optic or tactile supplements to the visual cues normally available in viewing audio-video displays.

Figure 1D:
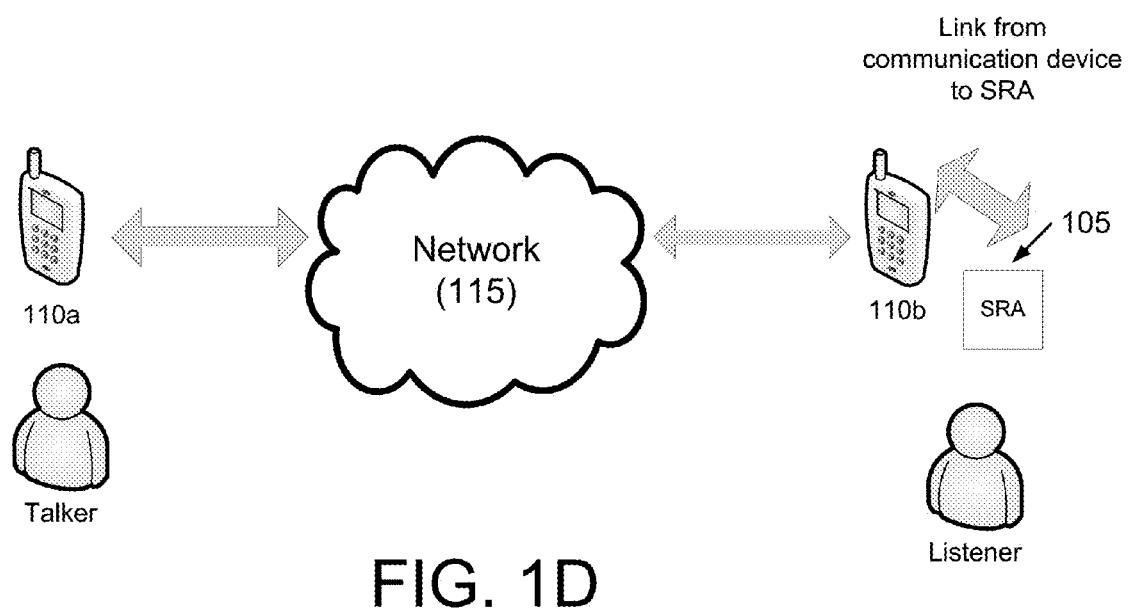
FIG. 1D depicts a system for intelligent speech recognition and processing according to another embodiment.

FIG. 1D depicts an implementation of the SRA 105 in which it receives signals from a communication device such as plain old telephones (POTS), mobile phones, smart phones with additional signal processing capabilities, Internet-based communication devices (hardware and/or software), Skype™, or other communication devices. The figure shows two people communicating with each other using communication devices. The talker may speak into first communication device 110a. The speech signals may be transmitted over a communication network 115 to a second communication device 110b at the receiving end of the network. Examples of communication networks include plain old telephone systems (POTS), cellular networks, WiFi networks, the Internet, personal area networks, satellite networks, near field communications networks, Bluetooth networks, and any combinations thereof. Any suitable communications network may be used as necessary and/or desired.

The signals reaching communication device 110b in FIG. 1D may be transmitted to the SRA 105 by means of acoustic and optic signals, and/or by means of hard-wired electrical links or electromagnetic links, such as telecoil links, Bluetooth links, or other radio links. The signals received by the SRA 105 may be processed to improve the intelligibility and/or sound quality of the speech.

Although SRA 105 is depicted as a separate element, the hardware, software, and/or functionality of SRA 105 may be incorporated into first communication device 110a and/or second communication device 110b.

The output of SRA 105 in FIG. 1D may consist of acoustic, electric, and/or optic signals. The acoustic signals may be delivered to the user by means of hearing aid output transducers, in-the-ear loudspeakers, earphones, or other acoustic transducers for delivering sound to the ear. The optic signals may be delivered to the user by means of video displays, head-worn optic displays, Google Glass, and other optic/video displays. Vibrating devices and other tactual transducers may also be used to deliver signals to the user. SRA 105 may also be used without the use of optic or tactile supplements to the visual cues normally available in viewing audio-video displays.

Figure 1E:
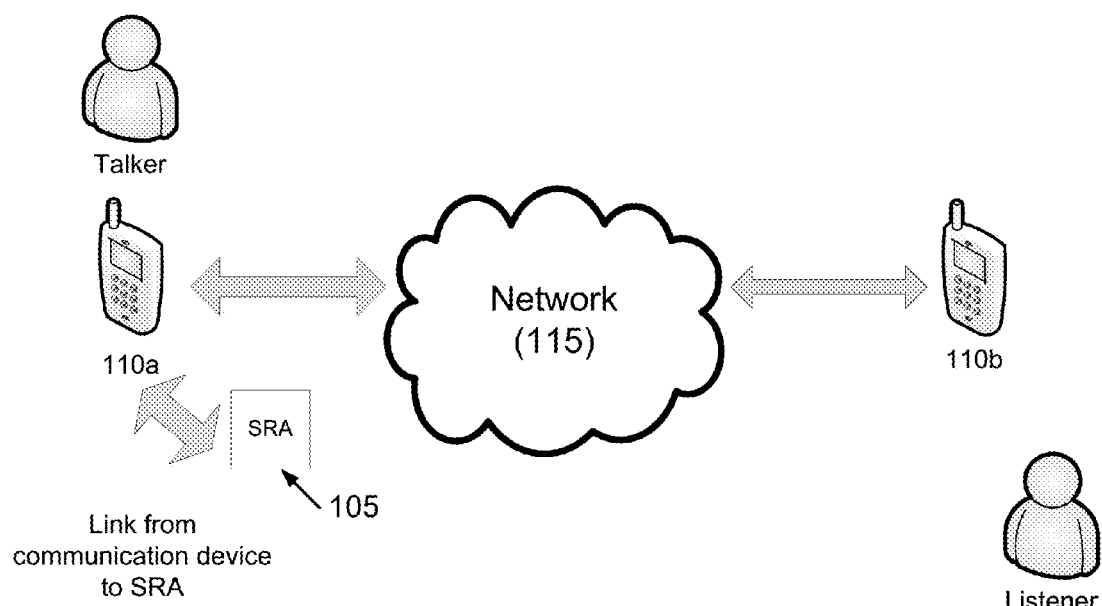
FIG. 1E depicts a system for intelligent speech recognition and processing according to another embodiment.

FIG. 1E depicts an embodiment in which first communication device 110a may include SRA 105 in addition to, or instead of, second communication device. Again, although SRA 105 is depicted as a separate element, the hardware, software, and/or functionality of SRA 105 may be incorporated into first communication device 110a.

In on embodiment, SRA 105 may be incorporated or provided to both first communication device 110a and second communication device 110b.

Figure 2:
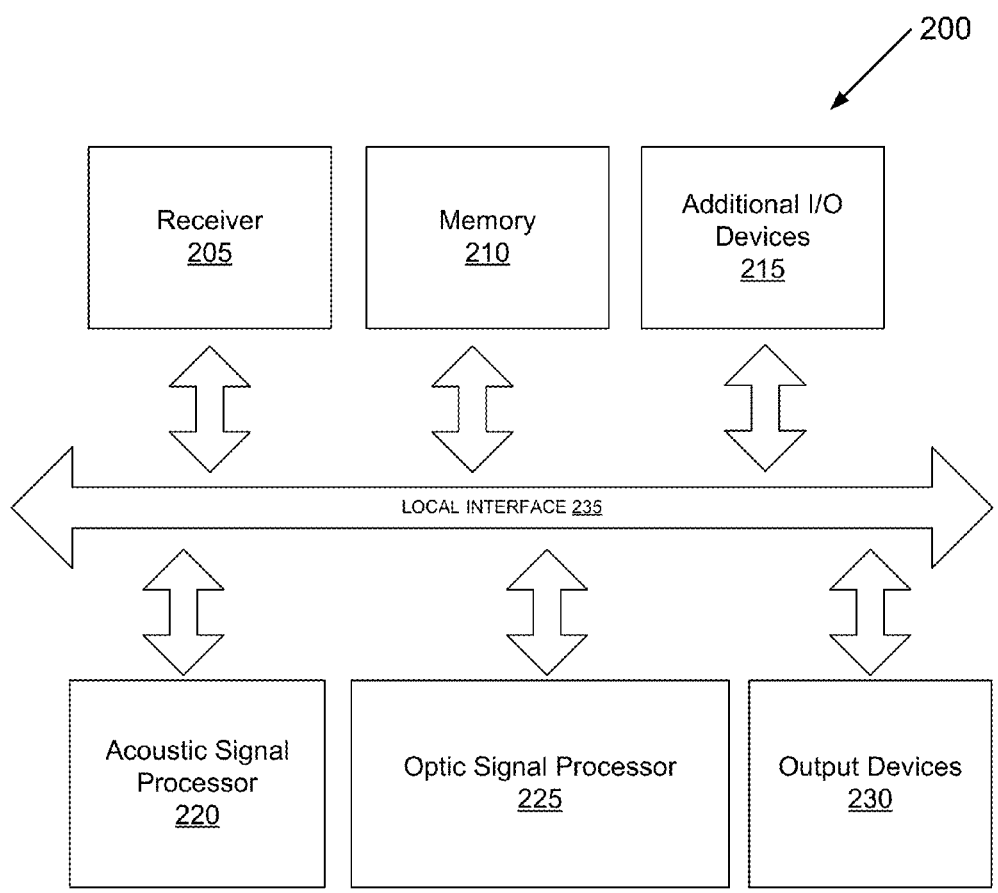
FIG. 2 depicts a block diagram of a device for intelligent speech recognition and processing according to one embodiment.

FIG. 2 depicts a block diagram for an embodiment of the SRA. Receiver 205 may pick up acoustic and optic signals reaching the SRA. These signals may be stored temporarily in memory 210. Additional I/O devices 215 may be accessed for optional processing, such as tactual output for a blind user. Acoustic signal processor 220 may process the acoustic signals synchronously with optic signal processor 225. Some or all of the components of the SRA, 205, 210, 215, 220, 225, 230, may be communicatively coupled via interface 235. The local interface 235 may be, for example but not limited to, one or more buses or other wired or wireless connections, as is known in the art. The processed acoustic and optic signals may be delivered to the user via output devices 230.

In one embodiment, the SRA 200 may be implemented in software, firmware, hardware or a combination thereof. In one embodiment, a portion of the device is implemented in software, as an executable program, and is executed by a special or general purpose computer, such as a microcomputer within the body of the SRA, or by means of a hard-wired or radio link to an external computer, such as a personal computer, personal data assistant, smart phone, workstation, mini-computer, mainframe computer, etc.

In another embodiment, one or more input/output (I/O) components (205, 215, 230) of the SRA 205 may include peripheral devices capable of receiving/delivering speech signals acoustically, optically, or tactually, such as microphones, cameras, tactual accelerometers, or other input sensors, hearing aid output transducers, in-the-ear loudspeakers, earphones, or other acoustic transducers for delivering sound to the ear, video displays, head-worn optic displays, Google Glass, computer displays, or other optic/video displays, vibrating devices or other tactual transducers for blind users, and the like. It should be recognized that input/output devices may involve additional hardware (not shown) that may be internal or separate from the SRA 200. The additional hardware may be connected, so as to provide communication, to/from the SRA 200 using standard wired (e.g., Universal Serial Bus) or standard wireless connections, such as telecoil links, Bluetooth links, or other radio links. Any suitable means for communicatively connecting additional hardware to the SRA 200 may be used as necessary or desired.

The SRA may be used as a conventional hearing aid in the non-speech recognition mode as well as in the speech-recognition mode. Operation of the hearing aid in the non-speech recognition mode allows for baseline data to be obtained of the user's ability to understand speech amplified by conventional means prior to the use of automatic speech recognition processing. Accordingly, the SRA may be fitted in the same way as a conventional hearing aid using a well-established fitting procedure, such as the NAL procedure developed by the Australian National Acoustic Laboratories, described in Dillon, H., "Hearing Aids," second edition, Section 9.2.2, pages 239 to 242. Sydney: Boomerang Press, New York, Stuttgart: Thieme, (2010), the disclosure of which is incorporated, by reference, in its entirety. Baseline data may then be obtained on how well the user is able to understand speech using conventional amplification. Standardized speech tests may be used for this purpose, such as the Hearing in Noise Test (HINT), described in Nilsson, M., Soli, S. D. and Sullivan, J. A., "Development of the Hearing in Noise Test for the measurement of speech reception thresholds in quiet and in noise," J Acoust Soc Am., 95, 1085-99 (1994), the disclosure of which is incorporated, by reference, in its entirety. Subjective evaluations of hearing aid benefit may also be obtained using standardized self-assessment questionnaires, such as the Abbreviated Profile of Hearing Aid Benefit, described in Cox, R. M. and Alexander, G. C., "The abbreviated profile of hearing aid benefit," Ear Hear., 16, 176-86, (1995), the disclosure of which is incorporated, by reference, in its entirety. In addition, the Client Oriented Scale of Improvement (COSI), may be administered to identify the benefit that the user desires most from the SRA, described in Dillon, H., James, A. and Ginis, J., "Client Oriented Scale of Improvement (COSI) and its relationship to several other measures of benefit and satisfaction provided by hearing aids.," J Am Acad Audiol. 8, 27-4, (1997), the disclosure of which is incorporated, by reference, in its entirety. Other tests and evaluative procedures may be used to determine the benefit of the hearing aid with and without speech-recognition processing. There are several levels of speech-recognition processing and the above baseline data are useful not only in providing a basis for evaluating the SRA, but also in identifying speech-recognition algorithms and their implementation that are appropriate for each user of the SRA. The COSI is designed to identify each individual's most important needs. This information coupled with the baseline data on each individual's capabilities with conventional amplification provide a means for determining the level of speech-recognition processing and implementation of appropriate algorithms that are likely to yield the greatest benefit. The various levels of speech recognition processing that may be implemented in the SRA are discussed below.

Speech Recognition Processing of Speech at the Sound-Class Level

Figure 3:
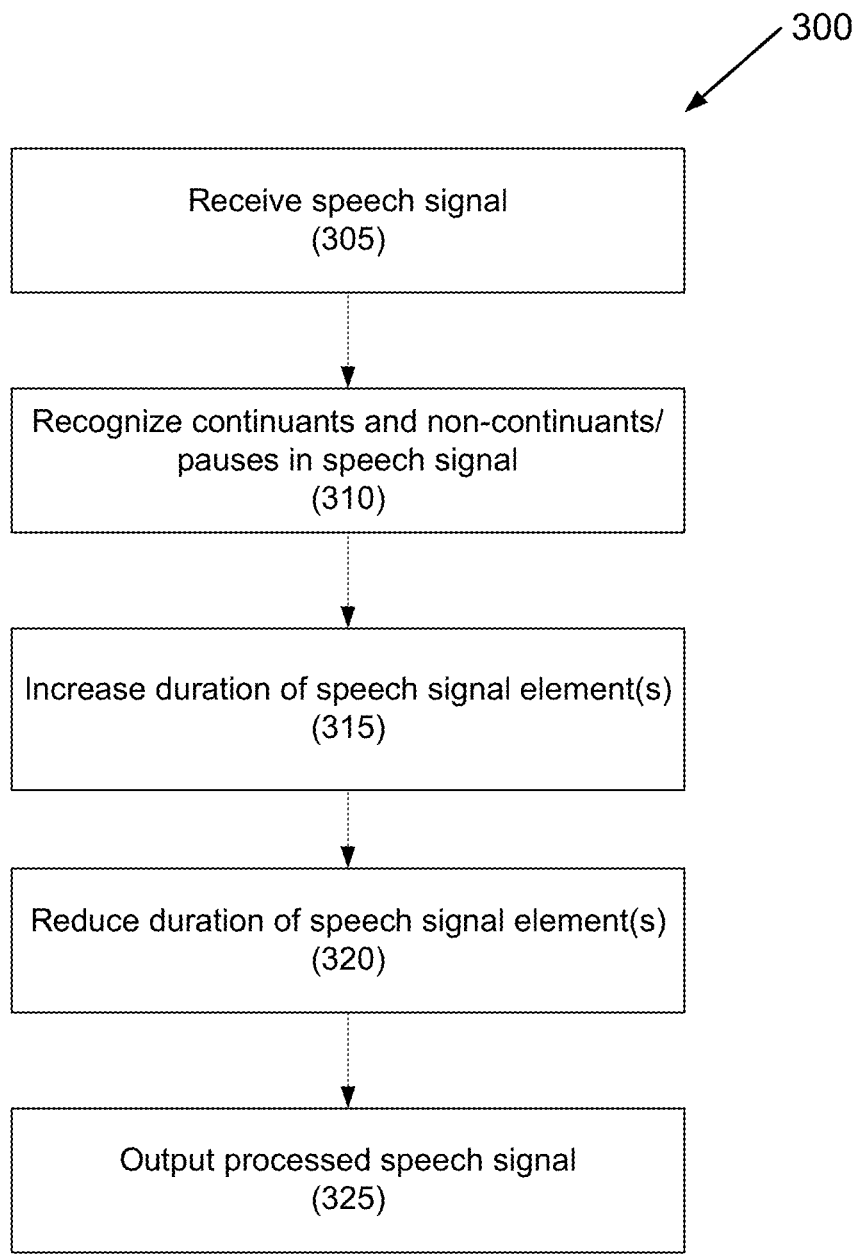
FIG. 3 depicts a method for processing speech at a sound-class level according to one embodiment.

According to embodiments, the SRA may operate at several different levels. Processing speech at the sound-class level generally requires the least amount of processing to obtain improvements in speech intelligibility and/or sound quality. FIG. 3 depicts a method for processing speech at the sound-class level, according to one embodiment. Seniors have difficulty understanding rapid speech, particularly the rapid speech of children. The normal age-related loss in auditory sensitivity is partly responsible, but a more significant factor is the normal age-related deficit in temporal processing combined with age-related deficits in cognitive processing. Under challenging listening conditions (background noise, reverberation, distorted telephone speech) young people with normal hearing will also demonstrate reduced temporal processing and poorer neural synchrony with the voice fundamental frequency, Fo. The SRA, in an embodiment according to method 300, slows down the speech signal and/or elements of the speech signal including pauses in order to compensate for the reduced rate of temporal processing and reduced neural synchrony. To improve time-synchronization of the processed speed signal with the original speech signal, the SRA may speed up certain elements of the speech signal including pauses in order to more closely approximate the overall rhythm and pace of the original speech signal (which may include non-auditory components) in the processed speech signal.

In step 305, the SRA may receive a speech signal. In one embodiment, the speech signal may experience reduced intelligibility, due to its rapid speech rate.

In step 310, the SRA may process the received speech signal in order to recognize continuant and non-continuant sound classes within the speech signal. Sound classes such as the continuants (vowels, diphthongs, nasals, fricatives) can be adjusted in duration without affecting meaning, while non-continuants (glides, stops) are especially sensitive to changes in duration. According to an embodiment, pauses may be recognized by a cessation of the speech signal. Continuants may be recognized, in step 310, by relatively slow formant transitions as well as small changes in the duration of pitch periods over time. An analysis of the periodicities of zero crossings may be used to track changes in Fo and may be implemented either digitally or using analog electronics.

According to another embodiment, the SRA may operate to identify continuants as well as pauses in the speech signal and thereafter increase their duration, in step 315. Accordingly, portions of the speech signal showing slow changes in formant values and pitch periods may be increased in duration to improve intelligibility.

In one embodiment, reduction of speech rate can be implemented using a relatively simple method of signal processing. Zero crossings in the speech waveform are identified and analyzed to determine those regions in the waveform where the zero crossings are periodic. The time difference between two periodic zero crossings is defined as a pitch period. An analysis is performed to identify regions of the waveform in which the pitch period is relatively stable. The waveforms in successive pairs of pitch periods are cross-correlated. If the peak of the cross-correlation function is greater than 0.95 the pitch periods in that section of the waveform are defined as being stable. The cross-correlation also serves as a check that the zero crossings are in fact periodic. It also provides a more accurate estimate of the pitch period if the speech waveform contains some noise. The regions of the waveform with stable pitch periods allow for pitch periods to be repeated or excised from the speech waveform without introducing audible distortions. Repeating pitch periods slows down the speech. Excising pitch periods speed up the speech. The durational adjustments to the speech signal are simple to simple to implement and may be automated with little difficulty. The method also allows for pitch synchronous spectrum analyses to be performed efficiently. In addition, lowering of the frequency spectrum can be obtained using a variation of the method. If X % of the pitch periods of a speech sound are excised and the waveform is played back at a faster rate so as not to alter the duration of the speech sound, the frequency spectrum of the speech sound will be lowered by X %. An exemplary method of adjusting speech rate by repeating or excising pitch periods is disclosed in Osberger, M. and H. Levitt, H., "The Effects of Timing Errors on the Intelligibility of Deaf Children's Speech," MJ. Acoust. Soc. Am., 1316-1324, 66 (1979). The method was used to improve the intelligibility of speech produced by deaf children. The disclosure of this document is incorporated, by reference, in its entirety.

The method has also been used to improve the intelligibility of conversational speech.

Conversational speech is more rapid than clearly enunciated speech. Seniors with age-related auditory processing deficits have difficulty understanding rapid speech, especially rapid speech produced by young children with a high fundamental frequency. Many of these seniors also have age-related high-frequency hearing loss which adds to the difficulty of understanding the speech of their grandchildren whose speech rate is not only rapid but also has substantial high frequency content because of their high fundamental frequency. Slowing down the speech will improve its intelligibility, provided the child pauses after an utterance to allow the processed slower speech to catch up. The spectrum of the speech can also be lowered to place more of the speech cues in frequency region where the listener has better hearing. There are limits, however with respect to how much the speech rate can be decreased or how much of the frequency lowering is possible before the speech sounds unnatural.

Slowing down speech rate is a simple and practical way of improving speech intelligibility for one-way transmissions of speech; i.e., when listening to a recording of speech. It can also be used for viewing video recordings provided the reduction in speech rate is synchronized between the audio and video channels. For two-way communication, as in a conversation, it is necessary for the talker to pause at the end of phrases and sentences in order for the slowed down, processed speech to catch up with that of the talker. This type of talker etiquette can work efficiently with people who know each other well, or who understand the need for pauses and slower speech when conversing with people with hearing loss, especially seniors with hearing loss and age-related auditory processing deficits.

Alternate embodiments of the SRA may employ other methods of increasing duration in step 315. For example, alternate embodiments may use duration increasing mechanisms, such as adding to the waveform asynchronously with pitch periods, or simply slowing down the rate of reproduction of the speech. In these embodiments, slowing down speech may introduce audible distortions. For audio-video speech transmission, the speech signal may be slowed down, in step 315, by repeating frames of the video signal synchronized with the repetition of pitch periods during the repeated frames. Synchronization of the audio and video signals should be within +/−10 msec to avoid the perception of asynchrony between the acoustic and optic speech signals. There are large individual differences between people with respect to how much perceptible asynchrony can be tolerated before there is a reduction in intelligibility and/or sound quality.

Slowing down the speech signal may introduce a delay in some embodiments. There are limits to how much delay can be tolerated by a listener, depending on the mode of communication. For example, face-to-face conversation may be more sensitive to delays in the reception of the speech signal, and remote conversation (as via telephone) less sensitive.

Optionally, step 320 may be performed by the SRA to reduce delay, if delays are experienced in speech processing. In one embodiment, an implementation which may reduce processing delays to an acceptable level in face-to-face communication may involve shortening relatively long continuants while lengthening short continuants so that the acoustic signal is synchronized with the visually perceived optic signal.

In an embodiment for processing acoustic speech signals in the absence of optic speech signals, relatively long delays introduced by increasing the duration of the speech signal, and/or elements of the speech signal in order to improve intelligibility may be tolerable for the listener. Accordingly, any suitable delay reduction implementation may be used, or adjusted, as necessary and/or desired. Care is needed not to use extreme changes in duration that may alter the stressed to unstressed pattern of speech. A reduction in perceived stress may be compensated for by increasing voice pitch.

An embodiment that does not require reduction in speech rate focusses on those speech sounds that are altered in duration only slightly in conversational speech. Stop consonants in word-final position are often produced without the stop burst and many consonants are produced with less intensity than in clearly articulated speech. Examples of such stop consonants are disclosed in Pincheny, M., Durlach, N., and Braida, L., "Speaking clearly for the hard of hearing I: Intelligibility differences between clear and conversational speech," J Speech Hear Res. 96-103, 1985, and in Pincheny, M. A, Durlach, N. I and Braida, L. D., "Speaking clearly for the hard of hearing. II: Acoustic characteristics of clear and conversational speech," J Speech Hear Res., 29, 434-46, 1986. The disclosure of these documents are incorporated, by reference, in their entireties.

These sounds may be recognized and then modified to increase their intelligibility using algorithms focusing on both the salient acoustic characteristics of the sound class containing sounds vulnerable to distortion in conversational speech and the acoustic characteristics of sounds that occur frequently with the vulnerable sounds. Algorithms of this type differ from those used in conventional methods of automatic speech recognition in that the search is for a subset of specific sound types and not on the recognition of all the sounds in an utterance. Also, the error rate (e.g., not spotting a vulnerable sound that has been shortened in conversational speech) can be much higher than that for conventional methods of automatic speech recognition where extremely low error rates are a requirement for a practical system.

According to another embodiment, an implementation used in step 320 can be used with intermittent or time varying background noise. In step 320, the SRA may adjust durations differentially depending on the noise intensity. Research has shown that in noise with significant variations in level with time the listener attends to the speech during time intervals when the speech-to-noise ratio is relatively good and does not, or is less able to, attend to the speech when the speech-to-noise ratio is relatively poor. In this embodiment, the speech may be slowed down during the time intervals when speech is audible thereby improving its intelligibility and using the intervals when speech is masked as a pause allowing the slowed-down speech to catch up.

In another embodiment of the SRA for telephone or Internet communication that is not face-to-face, speech processing of method 300 may be less sensitive to delays resulting from slowed-down speech. Conversational pauses may be desired of the person(s) speaking to allow the delayed speech to catch up, in step 320. These pauses may be introduced at the end of a phrase or sentence so as not to distort the prosody of the speech.

In step 325, the speech signal may be sent on to the user after processing has been completed for improved intelligibility.

In an embodiment for face-to-face communication over the Internet (e.g., using Skype™, Apple's FaceTime™, a video telephone, video conferencing equipment, etc.), the SRA may use both acoustic and optic input and output signals. Accordingly, Google Glass™, a mobile device, or similar apparatus for displaying video images may be used for displaying the slowed-down video speech signal. Furthermore, algorithms used by the SRA, in step 315 for slowing down the speech, may also be included in the computer or videophone used for remote face-to-face communication.

In another embodiment, additional intelligibility considerations for speech processing are addressed by the SRA. For example, the portion of the recording that is difficult to understand may be replayed on an external playback system with the SRA operating in a slowed-down speech mode.

The SRA may also be used to improve the intelligibility of reverberant public address systems, such as announcements at transportation terminals. In one embodiment, the SRA may initially amplify the announcements of a public address system in the non-speech-recognition mode of operation. The announcements may also be recorded by the SRA. If an announcement is not intelligible it can be played back by the SRA, on demand, applying some or all of the elements of method 300 to improve intelligibility of the playback signal. Several announcements may be recorded, stored and played back as needed. Improved intelligibility of important public address messages can thus be realized by the SRA.

Embodiments to Combat Asynchrony in Neural Processing

Figure 4:
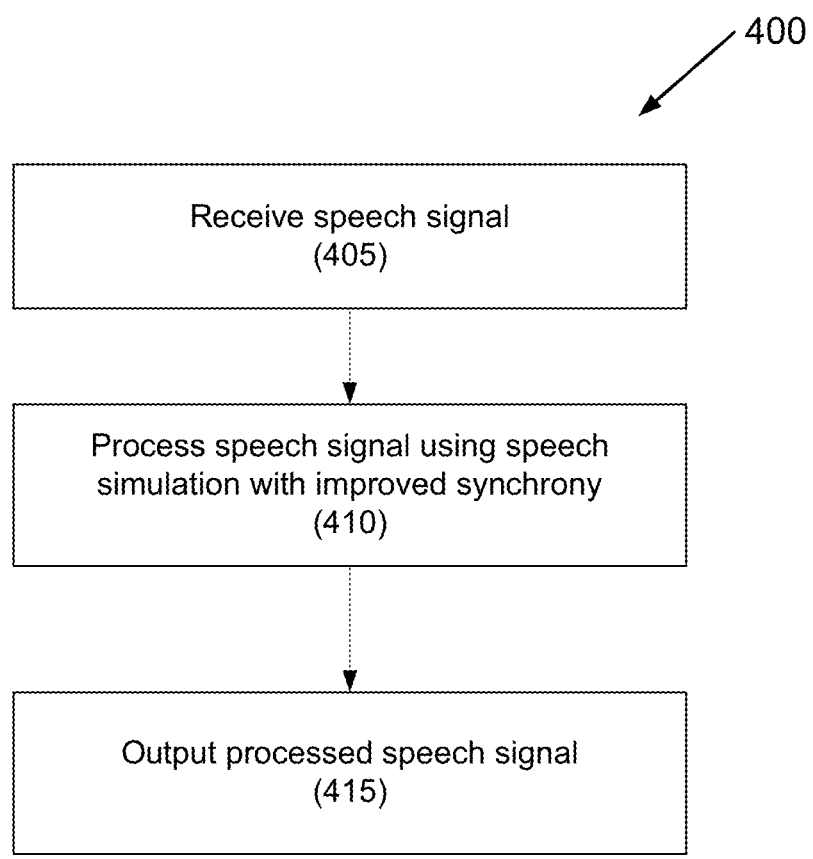
FIG. 4 depicts a method for processing speech at a sound-class level according to another embodiment.

FIG. 4 depicts a method for processing speech to address at the sound-class level, according to one embodiment. Research studies have deficient neural processing at the sub-cortical level for i) speech in noise (both normal-hearing and hearing-impaired people, but more so for the latter), ii) speech in quiet for people with a hearing loss, and iii) seniors with normal hearing for their age and age-related auditory processing deficits for their age. Examples of reduced processing at the sub-cortical level are disclosed in Levitt, H., Oden, C., Simon, H., Noack, C. and Lotze, A., "Computer-based training methods for age-related APD: Past, present, and future," Chapter 30 in Auditory Processing Disorders: Assessment, Management and Treatment: Second Edition, D Geffner and D Swain, (Eds.), pp 773-801, San Diego: Plural Press, 2012. The disclosure of this document is incorporated, by reference, in its entirety.

These studies have shown reduced synchrony between periodic stimulation of the vocal tract in voicing and the associated neural impulses conveying voicing information. For example, some voices are more intelligible than others, the more intelligible voices having stronger periodic stimulation of the vocal tract.

Referring to FIG. 4, the SRA may process a speech signal to simulate speech with strong periodic stimulation of the vocal tract designed to improve the synchrony of the neural impulses conveying voicing information.

In step 405, the SRA receives a speech signal. For people with a hearing loss, seniors with normal hearing for their age, or for anyone (young, old, normal hearing, hearing-impaired) listening to speech in noise, reverberation, or other interference, there may be reduced synchrony between the periodic stimulation of the vocal tract and the associated neural impulses conveying voicing information.

In step 410, the SRA may process the audio signal to simulate the received speech signal, and/or elements of the speech signal with stronger pitch pulses providing intense periodic stimulation of the vocal tract in the processed speech. Any suitable element, or combination of elements contained in the speech signal, may be used for processing as necessary and/or desired.

In step 410, the speech signal may be strengthened, re-generated, or simulated in order to reduce the listener's deficit in neural processing. One method may amplify the frequency region containing the voice fundamental frequency (Fo). This may be easily done for speech in quiet. However, many common environmental noises are relatively powerful in the frequency region of Fo and are effective in masking Fo. For these common noises, the harmonics of Fo may be detectable at higher frequencies where the noise is less intense. The spacing between harmonics of Fo in frequency regions where the noise level is low may provide a means for determining Fo.

In another embodiment, a supplementary signal containing Fo may be delivered to the listener by audition, taction or vision, or some combination of these modalities in order to improve intelligibility. Examples of such supplementary signals are disclosed in Hanin, L., Boothroyd, A., Hnath-Chisolm, T., "Tactile presentation of voice fundamental frequency as an aid to the speechreading of sentences," J. Ear Hear. 335-341 (1988). The disclosure of this document is incorporated, by reference, in its entirety. In one embodiment, the auditory supplement is simply added to the noisy speech signal. In another embodiment, the noisy Fo may be eliminated using a notch filter and replaced with noise-free values of Fo, as estimated from the harmonics Fo in noise-free frequency regions. In another embodiment, a tactual supplement may be delivered using a vibrating device. A convenient method of delivering a tactual signal in a hearing aid is to embed a small piezoelectric tactual transducer mounted in the ear mold of the SRA. Another embodiment may employ an optic supplement delivered by means of Google Glass™. In one such embodiment, a flashing icon may be superimposed on an image of the talker in the region of the throat. The icon may flash at a rate proportional to Fo and may also move up and down synchronously with the value of Fo. There is a significant body of experimental evidence that supplemental information on Fo delivered tactually or visually improves speech intelligibility for people with hearing loss or normal-hearing people listening in noise.

In step 410, according to another embodiment, the SRA re-generates, or simulates, the incoming speech signal and/or elements of the speech signal received in step 405, so as to improve the synchrony between periodic stimulation of the vocal tract and the associated neural impulses conveying voicing information. One embodiment is to replace the pitch pulses of the incoming speech signal with synthetic pitch pulses which approximate Dirac pulses thereby regenerating the speech signal, and/or elements of the speech signal with this new energy source that stimulates a much broader range of resonant frequencies in the vocal tract.

In this embodiment, a practical approximation to a Dirac pulse may be used consisting of a pulse of very short duration with rapid onsets and offsets. Pulses of this type may have a flat frequency spectrum over a wide frequency range. The idealized Dirac pulse is of zero duration and infinite amplitude with a flat frequency spectrum over an infinite frequency range. The fundamental frequency, Fo, which is generated by periodic stimulation with pulses that approximate a Dirac pulse, has more intense harmonics over a wider frequency range than Fo generated by the broader, less discrete pulses of the incoming speech signal. More importantly, the highly discrete pitch periods produced by periodic Dirac-like pulses are tracked with a greater degree of synchrony in neural processing of speech signals in the auditory system.

In another embodiment, linear predictive coding may be used to predict the decay of the speech signal in the interval between stimulating pulses. When the vocal tract is stimulated by a new pulse, the observed speech signal will differ from the predicted signal which assumes no new stimulation. The difference between the observed and predicted signals may be used to identify the shape of the pulse stimulating the vocal tract. The technique may be used to separate the sound transmission characteristics of the vocal tract from the pulsive sound source and to regenerate speech, and/or elements of the speech signal, with different sound sources stimulating the vocal tract.

The simulated speech or elements thereof generated in step 410 are designed to improve the synchrony of the neural impulses conveying voicing information. The technique may also improve the intelligibility of an impoverished speech signal.

In step 415, the speech signal may be sent to the user after processing for improved intelligibility is complete. The processed speech signal may be delivered acoustically by means of hearing aid output transducers, in-the-ear loudspeakers, earphones, or other acoustic transducers for delivering sound to the ear. In addition, the supplemental Fo information may be delivered tactually by means of a vibrator or other tactual transducer. In one implementation the tactual transducer may be a small piezoelectric transducer mounted in the ear mold of the SRA which is cosmetically more acceptable than wearing a large, visible tactual transducer. The tactual Fo supplement may be delivered using a practical approximation to a Dirac pulse as the periodic energy source in order to improve neural synchrony with the pitch pulses in Fo.

SRA Processing of Speech at the Segmental Level

Figure 5:
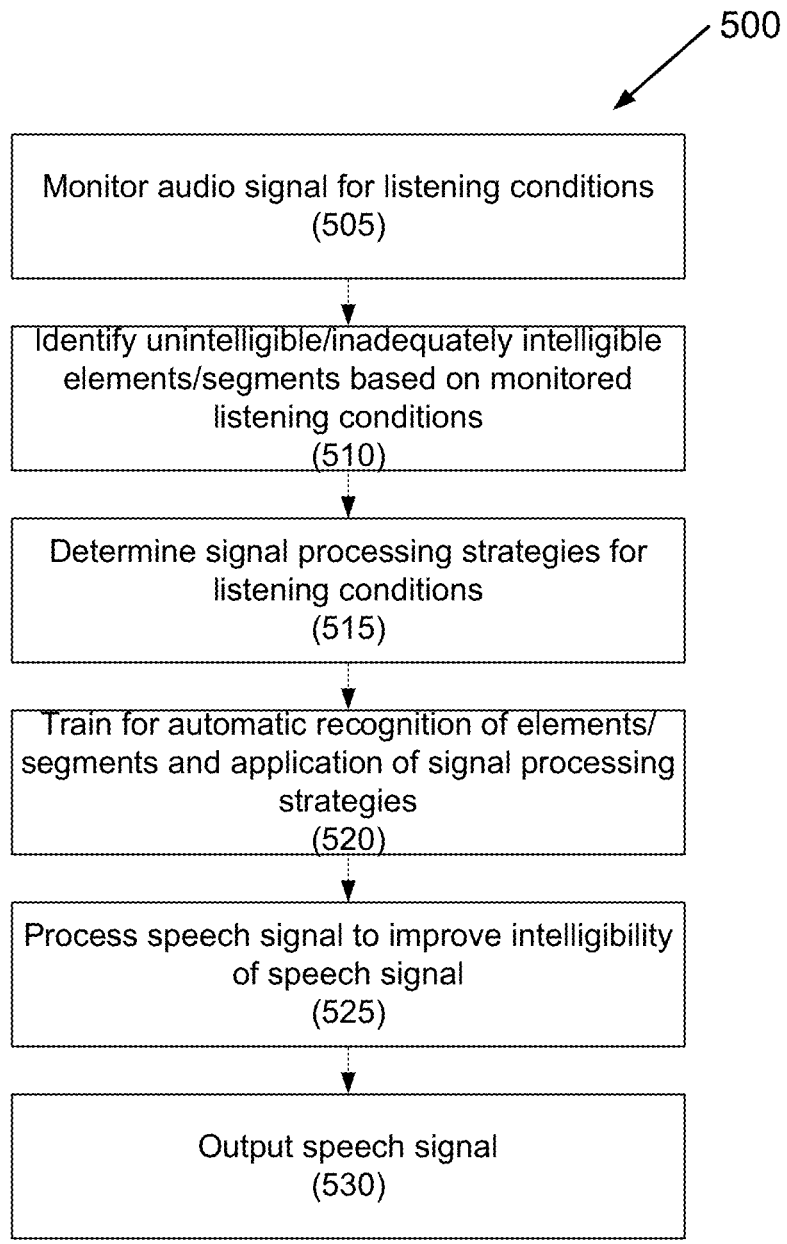
FIG. 5 depicts a method for processing speech at a segmental level according to one embodiment.

FIG. 5 depicts a method for processing speech at the segmental level, according to an embodiment.

In the embodiments, masking of speech sounds may reduce both intelligibility and sound quality initially received by the SRA. Accordingly, the SRA, in method 500, may process the speech signal to addresses the problem of masking.

In one embodiment of method 500, the SRA may be trained to recognize segments/elements in the received speech signal that are not intelligible, or inadequately intelligible, to the hearing aid user. Thereafter, the SRA may process the speech signal so as to maximize the intelligibility of these segments/elements thereby improving speech intelligibility and/or sound quality.

In another embodiment, during the method 500, the SRA may process the speech signal so as to maximize intelligibility and/or sound quality of the entire speech signal, not just the unintelligible segments/elements. According to this embodiment, processing may not be restricted to processing at the segmental level, but may further include supra-segmental processing. It should be noted that the speech signal, as received by the SRA, may have both an acoustic and optic component, and that the optic component may be particularly important at high levels of background noise and/or reverberation.

In step 505, the SRA may monitor audio signals in order to identify listening conditions that may be challenging for speech intelligibility.

In an embodiment involving training of the SRA, the acoustic signals reaching the user's ear may be recorded. The user may be provided with a convenient handheld or body-worn unit that allows the user to signal the SRA when speech is not intelligible. The SRA may store the received speech signals (acoustic and optic) temporarily in a continuously refreshed short-term memory such that when the SRA receives a signal indicating that the speech is unintelligible, the speech signals stored in the short-term memory for the past X seconds are recorded for future analysis. The value of X may be an adjustable parameter that allows for the recording and subsequent analysis of the received speech signals (including any interference) immediately before and during the time interval when the user signals that the speech is unintelligible.

Under challenging listening conditions, much of the received acoustic speech signal may not be intelligible. These unintelligible, or inadequately intelligible, speech signals recorded under conditions of everyday use of the hearing aid in step 505 may be stored initially in the SRA, and then transferred later to a larger unit with signal processing capabilities for a detailed analysis.

In step 510, the SRA may identify the segments/elements that are unintelligible, or inadequately intelligible, under challenging everyday listening conditions for each individual hearing aid user.

In step 515, the SRA may determine appropriate signal processing strategies for processing speech signals for challenging everyday listening conditions for each user of the SRA. In this embodiment, the most effective signal processing strategies for processing audio signals received in, or affected by, challenging everyday listening conditions may be determined for each user. In one embodiment, the SRA may alter its amplification characteristics (gain, frequency response, amplitude compression, frequency shifting) to improve the recognition of the impoverished speech. Models of human speech recognition such as the Articulation Index, Speech Transmission Index, and other models may be used to determine these amplification characteristics for people with hearing loss receiving speech signals distorted by frequency filtering, background noise, reverberation and other distortions commonly encountered in everyday use of hearing aids. Example are disclosed in Humes, L. E., Dirks, D. D., Bell, T. S., Ahlstbom, C. and Kincaid, G. E., "Application of the Articulation Index and the Speech Transmission Index to the Recognition of Speech by Normal-Hearing and Hearing-Impaired Listeners," J. Speech, Lang. Hear. Res., 29, 447-462 (1986), the disclosure of which is incorporated, by reference, in its entirety.

In another embodiment, impoverished speech may be replaced by regenerated or synthesized speech that is intelligible, not distorted and noise free. The regenerated or synthesized speech may be used to replace segments of the impoverished speech signal that are severely distorted, or larger sections of the impoverished speech including words and phrases. Some additional processing may be needed in merging the regenerated/resynthesized speech segments with the unprocessed speech in order to make the transition sound as natural as possible.

In an embodiment that is designed for use with a person who communicates frequently with the user of the SRA (e.g., a spouse) is to store the in the memory of the SRA a speech synthesizer that can reproduce the speech of this person. The parameters of the speech synthesizer may be fine-tuned to maximize the intelligibility and sound quality of the synthesized speech taking into account the nature and severity of the user's hearing loss. If a segment, or larger section including words and phrases, of the received acoustic speech signal from this person is severely distorted or missing, but the optic speech signal is received with no distortion, the SRA may recognize the speech accurately using primarily optic speech cues thereby allowing for the severely distorted or missing acoustic speech segments to be synthesized clearly with no distortion. A variation of this embodiment may use optic speech synthesis if the acoustic speech signal is received without distortion and the optic speech signal is either missing or severely distorted. An example of a method of optic speech synthesis is disclosed in Levitt, H., Toraskar. J. and Bakke, M., "Visual speech synthesis by concatenation. Proc. Int. Conf. Assoc. for the Advancement of Rehab. Technology," 232-233 (1988), the disclosure of which is incorporated, by reference, in its entirety.

In step 520, the SRA may be trained to automatically recognize segments/elements, or sequences thereof, that are unintelligible, or inadequately intelligible, for the hearing aid user under challenging everyday listening conditions. In one embodiment, a person who communicates frequently with the user of the SRA (e.g., a spouse) may produce a set of utterances under challenging listening conditions typically encountered in the everyday use of a hearing aid. Phonetic transcriptions of the utterances are provided to the SRA which then compares and refines its recognition of the utterances with the correct phonetic transcription. This may be done several times using repetitions of the utterances. In another embodiment, the SRA may be trained on a sinewave model of noisy speech in order to improve accuracy of speech recognition in noise. Examples of sinewave modeling to improve speech-to-noise ratio and results obtained with both normal and hearing-impaired listeners are disclosed in Levitt, H., Bakke, M., Kates, J., Neuman, A. C. and Weiss, M., "Advanced signal processing hearing aids," in Recent Developments in Hearing Instrument Technology, 15th Danavox Symposium, J. Beilin, and G. R. Jensen, (Eds.), pp 333-358, Copenhagen:Stougard Jensen (1993), the disclosure of which is incorporated, by reference, in its entirety. Whereas the use of sinewave models to improve speech recognition by human listeners has yielded only small improvements due to the limited spectral and temporal resolution of the human ear, the signal processing capabilities of the SRA are not subject to these limitations. Other methods of training the SRA may be implemented as needed or desired.

The SRA may then apply the signal processing strategies, previously determined in step 515 for improving the intelligibility, and/or sound quality, of the recognized speech segments.

In one embodiment, the SRA may have a self-training implementation. According to the self-training capability, the SRA may function so as to recognize the unintelligible segments encountered during speech processing operations. Subsequently, the SRA may dynamically update the speech processing strategies with feedback from the user. In one embodiment the user of the SRA may be provided with a convenient handheld or body worn signaling unit. In another embodiment, the user may provide an indication to the device through audible cues, to provide such feedback. Any acoustic signal that may be recognized by the SRA may be used as is necessary and/or desired. Whenever the SRA updates a speech processing strategy, the user sends a signal to the SRA indicating whether the update has resulted in an improvement or a decrement in the processed speech signal. No other communication is required from user other than these simple binary decisions. With each response from the user, the SRA modifies it speech processing strategy using an adaptive strategy to converge efficiently on the optimum speech processing strategy for the user for a given listening condition. Examples of adaptive strategies of this type for use in hearing aid adjustment are described in Neuman, A. C., Levitt, H., Mills, R. and Schwander. T., "An evaluation of three adaptive hearing aid selection strategies." J. Acoust. Soc. Am., 82, 1967-1976 (1987), the disclosure of which is incorporated, by reference, in its entirety.

The SRA may also identify unintelligible segments/elements, and concurrently execute other speech recognition and processing functions. In this embodiment, while actively processing incoming speech signals, for example, operating in the speech-recognition mode, the SRA may simultaneously monitor for challenging listening conditions. This may be determined from monitoring and identifying the user's utterance of words/phrases that indicate difficulty understanding, such as "could you please repeat that" or "what do you just say."

Furthermore, the SRA may identify the unintelligible segments/elements received in these challenging listening conditions, during speech processing, and adaptively adjust the strategies employed for processing these segments/elements. Thus, the SRA may not necessarily perform separate monitoring and/or training only processes (e.g., non-speech recognition mode), prior to conducting the speech recognition and processing of the embodiments. According to the embodiment, the SRA may accomplish self-training by conducting steps 505-520 in parallel, or effectively simultaneously, with any of the speech processing steps 525-530.

In one embodiment, the SRA may employ different processing strategies, determined in step 515, for different types of masking. Three types of masking that are commonly encountered in everyday speech communication are inter-segment masking, reverberant masking, and masking by background noise. Embodiments addressing each of these types of masking are described below.

Embodiments to Reduce Inter-Segment Masking

In one embodiment, the SRA may employ method 500 to reduce inter-segment masking.

Inter-segment masking is a major cause of reduced intelligibility for speech in quiet. For example, a strong (e.g., high intensity) segment may mask a neighboring weak (e.g., low intensity) segment as a result of temporal spread of masking. Amplification of the speech signal by a hearing aid increases spread of masking. Inter-segment masking may be a significant problem for seniors with age-related deficits in temporal and cognitive processing.

Temporal spread of masking may be substantial when a weak segment follows a strong segment (forward masking). There is less temporal masking when a weak segment precedes a strong segment (backward masking). Speech intelligibility and/or sound quality may be improved when weak segments are increased in intensity relative to neighboring strong segments. It may be an additional consideration that too large of an increase in intensity, however, may reduce intelligibility and/or sound quality. Thus, there may be large individual differences among people with hearing loss regarding how much of an increase in the level of a week segment is beneficial.

As demonstrated in Kennedy, E., Levitt, H., Neuman, A. C., and Weiss, M., "Consonant-vowel intensity ratios for maximizing consonant recognition by hearing-impaired listeners," J. Acoust. Soc. Am., 103, 1098-1114 (1998), speech recognition can be improved by individualized adjustment of the intensity of each sound in the speech signal for each listener. The disclosure of this document is incorporated, by reference, in its entirety. A low intensity sound following a strong intensity sound may require more amplification to be intelligible for Listener A than for listener B. The SRA needs to be trained to recognize which speech sounds in which phonetic environment need to be processed to be intelligible to the user of the hearing aid. The first stage in the training process is to identify speech sounds that are candidates for additional processing under conditions of everyday speech communication.

In one embodiment, in step 510, strong-weak segment pairs in which a weak segment is masked by a neighboring strong segment may be identified. In the embodiment, field recordings may be obtained of the received acoustic speech signal during conventional use of the SRA. In this embodiment, the user may be provided with a convenient handheld or body-worn unit that allows the user to signal to the SRA when speech is not intelligible. In another embodiment, the SRA may recognize when the speech may not be intelligible based on comments from the user (e.g., "please repeat that" or "what did you say"). When a signal indicating speech is unintelligible is received by the SRA, a recording is made of the received signal (speech plus interference received acoustically at the input microphones and cameras). These recordings may be analyzed to identify which speech sounds commonly encountered by the user in everyday speech communication need to be processed for improved intelligibility and/or sound quality.

Therefore, the SRA can be used to efficiently identify for each user the strong-weak segment pairs that are primarily responsible for the reduction in intelligibility and/or sound quality for speech in quiet.

Once the SRA has been worn for a period of time to identify the speech sounds in need of processing for improved intelligibility and/or sound quality, the SRA is trained, using the recordings obtained in the previous stage, to recognize the speech sounds in need of additional processing. The next stage is to develop methods of processing these sounds to improve speech intelligibility of speech sounds that have been identified as being in need of additional processing.

In one embodiment, the method developed by Kennedy et al. (1998) may be implemented in which low-intensity speech sounds are adjusted in level systematically to maximize their intelligibility for each user. The amount of gain is likely to depend on the sound's phonetic context which needs to be taken into account. Speech tests with the hearing aid user may be performed to obtain this information. If substantial testing is required, this may be done in stages, beginning with the sounds most in need of processing for improved intelligibility. Examples of the method of testing and experimental findings are described in Kennedy, E., Levitt, H., Neuman, A. C., and Weiss, M., "Consonant-vowel intensity ratios for maximizing consonant recognition by hearing-impaired listeners," J. Acoust. Soc. Am., 103, 1098-1114 (1998). The disclosure of this document is incorporated, by reference, in its entirety.

The SRA may then be programmed to implement the method of processing derived for a given sound whenever that sound is recognized by the SRA in everyday communication.

In another embodiment, no training may be performed.

According to the embodiments, during step 515, the SRA may determine the most appropriate signal processing strategy for the user. The SRA may operate to employ behavioral measurements to take into account individual differences in the implementation of the signal processing strategy. Therefore, the appropriate signal processing strategy for maximizing intelligibility and/or sound quality may be determined for each individual user of a SRA device, respectively. Efficient adaptive search procedures have been developed, and may be employed for optimizing the determination of a signal processing strategy for each user. Examples are disclosed in Neuman, A. C., Levitt, H., Mills, R. and Schwander. T., "An evaluation of three adaptive hearing aid selection strategies." J. Acoust. Soc. Am., 82, 1967-1976 (1987). The disclosure of this document is incorporated, by reference, in its entirety.

In step 520, the SRA may be trained to automatically recognize segment pairs that are unintelligible, or inadequately intelligible, for the user as previously identified in step 510 of the method. Additionally, the SRA may be trained to apply the previously determined individualized signal processing strategy.

In step 525, according to other embodiments, the SRA may process the received speech signal. The processing may include filtering the received speech signal into a set of contiguous frequency filters with bandwidths equal to the critical band of hearing which varies as a function of frequency. During this processing, the SRA may also perform signal analysis taking into account masking effects within and between critical bands to improve intelligibility of the speech signal.

In another embodiment, the duration of the less intense segment in a pair may be increased in step 525 in order to improve intelligibility and/or sound quality. The change in duration can be instead of, or in addition to, an increase in intensity. It may be necessary and/or desired to shorten the duration of the more intense segment by an equal amount in order not to change the overall duration of the speech. Any other suitable implementation or adjustments to segment duration may be used as necessary and/or desired.

In step 530, the signal may be output to the user or to another device after processing for improved intelligibility is complete.

In another embodiment, the SRA may perform signal switching, such as can be implemented using binaural hearing aids. In this embodiment, the output speech signal may be switched rapidly between the two ears. Therefore, immediately after an intense segment, the following less-intense segment may be switched to the opposite ear of the user. The SRA may operate to eliminate temporal spread of masking by the intense segment using this technique. In addition, the intensity and/or duration of the less-intense segment may also be increased so as to maximize intelligibility and/or sound quality. According to the embodiments, the SRA output may produce the perception of a single sound image located near the center of the user's head, by rapidly switching the speech signal between ears. Additionally, switching transients may be reduced to a low level by an appropriate choice of rise and fall-times at each ear. Examples of the method of interaural switching are disclosed in Hoffman, I. and Levitt, H., "A Note on Simultaneous and Interleaved Masking," J. Communication Disorders, 11, 207-213 (1978). The disclosure of this document is incorporated, by reference, in its entirety.

Embodiments to Reduce Reverberant Masking

In another embodiment, the SRA may reduce reverberant masking.

In general, reverberant masking includes both simultaneous and temporal spread of masking. Simultaneous masking occurs when the reverberant portion of preceding segments overlaps the segments that follow. Temporal forward masking occurs when the reverberant signal masks one or more segments that follow.

Not all reverberation is damaging to intelligibility or sound quality. Low level reverberation, as in a well-designed auditorium, strengthens the received speech signal and improves both intelligibility and sound quality. Speech in an anechoic chamber, for example, sounds weak and unnatural. Moderate level reverberation may reduce intelligibility by a small amount, but may also reduce sound quality substantially. High level reverberation substantially reduces both intelligibility and sound quality. There are large individual differences among hearing aid users regarding the perception of reverberation and the boundary between acceptable and unacceptable levels of reverberation.

According to the embodiments, the SRA may perform a between-ear analysis of the speech signals in step 520. For example, the speech signal reaching the two ears may be analyzed in order to determine the amount of reverberation in the received signal as a function of frequency. Examples are disclosed in Allen, et al., (1977). In order to perform this analysis, the received acoustic speech signal at each ear is subdivided into a set of contiguous frequency bands. Bandwidths corresponding to the critical band of hearing are used for this analysis. A running cross correlation is then performed on the signals in corresponding frequency bands at the two ears. A low between-ear correlation indicates a high degree of reverberation. A high between-ear correlation indicates a strong signal relative to the reverberation.

In the embodiment, frequency bands with negligible between-ear correlation consist of reverberation that is significantly higher than the speech signal and are attenuated. Those frequency bands with a high between-ear correlation contain a strong speech signal and are amplified. The time-offset of the peak in the cross correlation function identifies the interaural time delay of the received speech signal. This information may be used to determine the direction of the received speech signal.

In step 525, for the case of speech and noise coming from different directions, well-established methods of signal processing may be used to amplify signals coming from the direction of the speech and to attenuate signals coming from the direction of the noise, thereby increasing the speech-to-noise ratio with concomitant improvements in speech intelligibility and sound quality. Examples include the use of directional microphones and two-channel signal processing using the Griffiths-Jim algorithm, disclosed in Peterson et al., (1987).

In step 530, the signal may be output to the user after processing for improved intelligibility is complete. Optionally, the speech signal may be output to the listener during processing, in step 530.

Embodiments to Reduce Masking by Background Noise

In another embodiment, the SRA employs method 500 to reduce masking that may be caused by background noise.

In an embodiment, masking by background noise may be particularly damaging to both speech intelligibility and sound quality. In conventional amplification devices, such as hearing aids, both the speech and background noise are amplified. As a result, conventional amplification devices provide little or no benefit in noise unless some form of signal processing is implemented to reduce the noise level.

In another embodiment, the SRA may receive speech signals simultaneously with environmental noise, or other forms of interference. Environmental noises typically have a frequency spectrum that differs from that of speech. Environmental noise may also have a temporal structure that differs from that of speech.

Accordingly, embodiments of the SRA may use elements of automatic speech recognition to improve the intelligibility and/or sound quality of speech masked by background noise.

In an embodiment, the SRA may experience masking by intense background noise. The masking may produce spread-of-masking across frequencies in addition to same-frequency masking.

Accordingly, in step 525, the SRA may employ a signal processing strategy for reducing frequency-spread-of-masking. The signal processing strategy may include filtering the received speech signal into a set of contiguous frequency bands. Further, the processing strategy may include attenuating those frequency bands with intense noise that completely masks the speech signal within the frequency band. This method of signal processing is widely used in modern hearing aids.

Thus, during step 525, the SRA may employ automatic speech recognition, in addition to the above method of noise reduction processing. Any suitable implementation for processing the speech signal, and/or elements of the speech signal, may be used as necessary and/or desired. The implementation may include speech signal processing used in an embodiment, or in any combination of embodiments, as described herein.

Well-established automatic speech recognition algorithms may be used to recognize the segments/elements in the received speech signal. For example, available acoustic speech cues in the low-noise spectral and temporal regions may be analyzed. Furthermore, optic cues provided by a peripheral device, such as a wearable camera, may be used to supplement the speech cues conveyed by the noisy acoustic speech signal, thereby obtaining more accurate automatic recognition of the speech.

In another embodiment, the analysis of the acoustic speech signal may include recognition of speech cues in frequency regions beyond the normal range of hearing.

In another embodiment, the SRA may perform a spectral-temporal analysis of the received noisy speech signal to identify those temporal and spectral regions where the intensity of the background noise is less than that of the speech.

In another embodiment, the SRA may analyze the amplitude and time differences between the two ears. Particularly, in the embodiment, the difference between the received acoustic signal at each ear in those spectral and temporal regions with noise intensities well below that of the speech, including spectral regions beyond the normal range of hearing, may allow for the direction of the received acoustic speech signal to be identified. Well-established binaural signal processing techniques can be used to amplify signals coming from the direction of the speech signal and to attenuate signals coming from other directions, thereby increasing the speech-to-noise ratio. Therefore, the SRA may improve intelligibility and/or sound quality of speech.

In embodiments, both acoustic and optic components of the received speech signal may be used by the SRA. For example, segments/elements may be encoded for delivery to the SRA by means of vision and/or taction. The visual speech cues may be delivered via a visual display showing the speech source (e.g., talker) with icons or text characters that may represent segments/elements or types superimposed on an associated display area, such as the talker's face, for example. A peripheral device of the SRA may be capable of receiving/delivering visual speech signals, such as Google Glass, and therefore may be used in this embodiment. In another embodiment, a display system, that may be a peripheral device of the SRA, may project a virtual image in a particular display area (e.g., superimposed on the talker's face).

Additionally, there may be several ways of coding the segments/elements according to the embodiments of the SRA. For example, a visual display may employ multiple icons or text characters showing one or more segment/element types (e.g., one icon may indicates whether the segment/element is voiced or voiceless, a second icon may indicate if the segment is a stop consonant, and a third icon may indicate if the segment is a fricative). Continuing in the example, the remaining speech sounds (vowels, diphthongs, nasals, glides, laterals) may be coded by the color of the visual image. Voiced and voiceless stops are indistinguishable in speechreading. A simple icon showing the voiced-voiceless distinction may be helpful in speechreading. The stop burst is an important element of a stop consonant and an icon representing the intensity of the stop burst is a useful cue relating to the voiced-voiceless distinction in stop consonants. It is also important that the visual display of speech segments, or elements of a speech segment, be synchronous with the acoustic speech signal.

In an embodiment that delivers speech cues by taction, one or more vibrating device may be used. In one such embodiment, an on-off vibrator may be used for each of the various icons and/or text characters used in the visual display, and one or more additional vibrators, with a variable rate of vibration, may be used to encode vowels and vowel-like sounds. Other visual and tactual displays may be used depending on the user's speech-reading ability.

In another embodiment, a display, which may be a peripheral device, may be used to supplement normal speech reading cues. For example, a single visual icon or text character or a single vibrator may be used to convey voice pitch. The display may indicate whether a segment/element is voiced or unvoiced. Also, the display may convey intonation and prosodic cues.

In the embodiments, the SRA may employ various noise reduction methods during the processing of speech signals. For example, a noisy acoustic speech signal may be processed using well-established methods of acoustic amplification with digital noise reduction. Well-established automatic speech recognition algorithms may be used to recognize the segments/elements in the received speech signal to enable processing of the signal for increased segment/element intelligibility in the presence of noise.

In step 530, the SRA may output the processed acoustic speech, with reduced noise, by means of audition, either monaurally or binaurally. Thus, the SRA may enable improve intelligibility and/or sound quality of speech by employing various noise reduction mechanisms. In one embodiment, the SRA may output speech with reduced same-frequency masking as well as reduced temporal- and frequency-spread-of-masking.

Embodiments to Reduce Unstable Acoustic Feedback

In another embodiment, the SRA may employ method 500 to reduce acoustic feedback.

According to the embodiments, processing at the SRA segment/element level, may allow for more efficient elimination of unstable acoustic feedback than existing methods. The SRA may address various problems with current methods of acoustic feedback reduction. An example of problems encountered in the current art may include dependence on probe signals to identify the properties of the feedback path, and the need to mask such probe signals by the audio signal that is being amplified. To achieve probe signal masking, a low-amplitude probe signal may be used; however, a low-amplitude probe signal may result in poor resolution of the estimated feedback path, which in turn may limit the amount of feedback reduction that can be achieved. Consequently, feedback may begin to be perceived by the user at a lower than optimal level of amplification. The SRA may use a probe signal matched with, and substituted for, a particular segment/element; thereby' avoiding the need for probe signal masking and, consequently, allowing the probe signal to be relatively intense, thereby estimating the feedback path with much greater resolution, which in turn may allow a higher, optimal level of amplification before the user perceives the onset of feedback. Therefore, the SRA may improve feedback reduction.

In the embodiments, SRA feedback reduction may be based on a determination of the user's hearing. According to one embodiment, the feedback reduction may be based on a determination of the sensitivity of the user's ear to the intensity-frequency spectrum of random waveforms. Additionally, it may be determined that the user's ear is sensitive to the spectrum of random wave-forms but not sensitive to the waveform per se. For example, two random noise waveforms with the same intensity-frequency spectrum may sound the same. The SRA in a phonetic mode of operation may analyze the incoming speech signal in terms of phonetic sound types. Voiced continuant sounds such as vowels have a periodic structure, which may be determined by the periodic vibrations of the vocal cords. Voiceless fricative consonants may be produced by turbulent airflow in the vocal tract resulting in random waveforms with an intensity-frequency spectrum determined by the shape of the vocal tract.

In an embodiment, the SRA may operate to recognize voiceless fricatives and replace the random waveform of the fricative with a known waveform that is perceptually indistinguishable from the random waveform. This may be accomplished by summing several sine waves with frequencies and amplitudes that match the spectrum of the random waveform. The frequencies and amplitudes of the simulated random waveform may be known to the SRA. The random-like signal with the known waveform may be used as the probe for estimating the feedback path. A well-established method of feedback reduction may be used with this probe. Since the probe is part of the speech signal being amplified, it may provide an estimate of the feedback path with considerably more resolution than a conventional probe which may at a low level and masked by the speech signal that is being amplified.

SRA Processing of Speech at the Supra-Segmental Level

According to the embodiments, the SRA may perform segmental analysis of the received speech signal and/or analysis at the segmental level of the received speech.

Very powerful methods of automatic speech recognition have been developed for recognizing speech at the supra-segmental level. Modern automatic speech recognition devices are commonly used for converting speech to text. The methods used in these devices may also be used to produce a phonetic representation of the speech.

In the embodiments, the SRA may operate to employ automatic speech recognition algorithms to recognize the received acoustic speech signal and to produce a phonetic representation of the speech. Thereafter, a new version of the speech may be generated using well-established methods of speech synthesis or speech reproduction. The synthesized or reproduced speech may be slowed compared to the unprocessed speech, in order to be more intelligible to people with hearing loss, including seniors with age-related deficits in temporal and cognitive processing.

The SRA may employ various signal processing methods for slowing down the speech and/or the elements of speech, and for processing the speech to be more intelligible. These methods may include any variation of signal processing methods used in preceding embodiments, such as improving the intelligibility of weak segments/elements.

In the embodiments, the SRA may be designed for listening to recordings of speech, such as lectures, where the process of slowing down the speech and/or the elements of speech may not cause any inconvenience, or reduced intelligibility, for the listener.

In other embodiments, the SRA may employ automatic speech recognition algorithms to recognize the received speech signal. Both the acoustic and optic components of the received speech signal may be included in the automatic speech recognition process. The output of the SRA may include both acoustic and optic speech signals. The optic speech signals may be output by the SRA device for increased intelligibility. Additionally, an optic speech signal may be output by a peripheral device communicatively coupled to the SRA, such as video recorder/reproducer, DVD player, or similar device. If the speech is slowed down, the frame rate of the video reproducer may require adjustment in order to maintain synchrony with the acoustic speech signal. Methods described in preceding embodiments of the SRA may be used for the purpose of maintaining synchrony.

In other embodiments, the SRA may use automatic speech recognition algorithms to recognize the received acoustic speech signal and to produce a phonetic representation of the speech. Accordingly, a new version of the speech and/or the elements of speech may be generated using well-established methods of speech synthesis or speech reproduction. The synthesized or reproduced speech may incorporate any variation or combination of methods for improving intelligibility used in preceding embodiments. For example, the embodiment may further include the constraint that the rate of speech production is on average the same as that of the unprocessed speech. This constraint may enable the SRA to be used conveniently in live, face-to-face conversations with other people.

In yet another embodiment, the SRA may operate to use automatic speech recognition algorithms to recognize the received acoustic speech signal and to produce a phonetic representation of the speech. Thereafter, the received acoustic speech signal may be modified so as to improve its intelligibility. In the embodiments, the SRA may use any variation of methods employed in preceding embodiments, such as improving the intelligibility of weak segments/elements. Modification of the received speech signal and/or elements of the speech signal may be used rather than synthesizing or reproducing a new version of the speech, in order for the talker's voice to be recognizable and sound more natural.

According to other embodiments, the SRA may operate in noisy and reverberant environments. In these embodiments, the SRA may employ automatic speech recognition algorithms to recognize the received speech signal. Both the acoustic and optic components of the received speech signal may be included in the automatic speech recognition process. The output of the SRA in this application may consist of: 1) a synthesized or reproduced acoustic speech signal in quiet, 2) a synthesized or reproduced acoustic speech signal in quiet played back synchronously with a video recording of the received optic speech signal, 3) a modified version of the received acoustic speech signal that has been processed for noise reduction which may be played back synchronously with a video recording of the received optic speech signal, 4) a synthesized or reproduced acoustic speech signal in quiet that includes signal processing methods employed in preceding embodiments to improve intelligibility. These signal processing methods may include various implementations, such as, improving the intelligibility of weak segments/elements, and modifications of the received optic speech signal to improve the intelligibility of visual speech cues, such as increasing the mouth opening during vowels and enhancing the visibility of the teeth and tongue.

According to another embodiment, the SRA may operate to provide word and/or phrase spotting. The embodiments may prove to be effective in situations where common words or phrases are used frequently. For example, common words and/or phrases may be identified during conversations (e.g., spotting) with a spouse, a colleague, or any person and/or device that may be a frequent source of speech for the SRA user. In the embodiments, the SRA may be trained to recognize words and phrases that are frequently used. The training may be performed by the SRA, or it may be provided by a device or devices that are separate from the SRA (e.g., smart phone, separate electronic device, computer (e.g., tablet computer, notebook computer, desktop computer, etc.), remotely from the SRA (e.g., a centralized service area), etc. The training may be performed by the user, or the device may be self-trained. This training of the SRA may increase the speed and accuracy with which the received speech signal is recognized. In addition, knowledge of speech patterns common to a given speaker may improve the efficiency and accuracy of the SRA device in recognizing that person's speech. Also, a spouse, colleague, or close friend can learn to produce frequently used phrases in a consistent way. For example, "It's time for dinner" may be stored, or otherwise designated in the SRA as a frequently used phrase. In another embodiment, the SRA may employ predetermined words and/or phrases (e.g., preset, etc.). The use of predetermined words and/or phrases may cause the particular training tasks described above to be optionally performed. According to the embodiment, one or more words and/or phrases may be stored in a storage device, such as the memory of the SRA. Any suitable memory (i.e., remote or local) may be used as necessary and/or desired. A relatively large set of these phrases may be recognized rapidly and accurately by the SRA, and may be reproduced in a manner that increases both recognition and intelligibility of speech.

An important aspect of speech-recognition processing is that a wide range of different cues can be used in the recognition process In addition to the substantial information conveyed by conventional acoustic and optic cues in automatic speech recognition systems, there are also acoustic speech cues outside the normal range of hearing, or acoustic cues that are masked to human hearing by limitations of frequency and temporal resolution in the peripheral auditory system. The greater the number of speech cues that can be detected and analyzed by the speech-recognition processor, the greater the robustness of the speech recognition process for impoverished speech. Of particular importance for recognition of conversational speech is the information conveyed by the phonetic, linguistic, semantic cues and the statistical properties of the many components of speech. Modern automatic speech recognition devices make use of these cues, albeit imperfectly, in addition to the physical cues in the acoustic and optic speech signal. An embodiment that takes all speech cues into account including acoustic cues beyond the range of normal hearing, acoustic cues that are not processed auditorially because of limitations of the peripheral auditory system, optic cues that are beyond the range of normal vision (such as vibrations of the lips and cheeks that are not visible to the naked eye during stops consonants), vibrational cues during nasal consonants and other tactual cues used in the Tadoma method of communication by deaf-blind people, in addition to the non-physical phonetic, linguistic, semantic and statistical and statistical properties of language that is used, processes all of these cues using a hidden Markov model of speech recognition. The output of this speech-recognition device is then fed into a speech synthesizer which reproduces the speech. For the case of an impoverished acoustic, optic and tactual speech input, such as may result from background noise, reverberation, and distortions introduced by electronic and radio communication systems, the speech-recognition processor uses redundant cues to compensate for missing or distorted speech cues in the input speech signal. The regenerated speech signal is then delivered by acoustic, optic and tactual means to a human, or to another machine.

Figure 6:
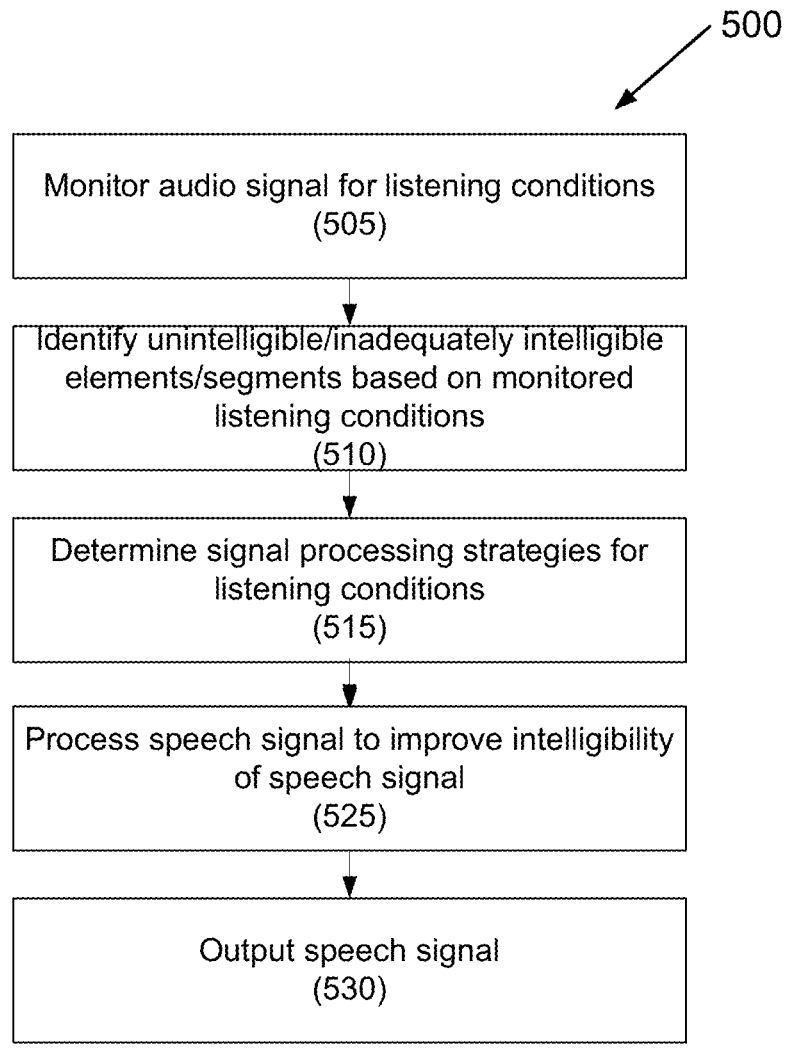
FIG. 6 depicts a method for processing speech at a segmental level according to one embodiment.

FIG. 6 depicts a method for processing speech at a segmental level according to one embodiment. The embodiment of FIG. 6 differs from that of FIG. 5 in that FIG. 6 does not depict the optional step of 525, training. Steps 505, 510, 515, 525, and 530 are substantially similar to those described in embodiments above.

The following U.S. Patent Applications are incorporated, by reference, in their entireties: U.S. Provisional Patent Application Ser. No. 61/938,072, filed Dec. 10, 2014; U.S. Provisional Patent Application Ser. No. 61/981,010, filed Apr. 17, 2014; U.S. patent application Ser. No. 14/617,527, filed Feb. 9, 2015; and U.S. patent application Ser. No. 14/689,396, filed Apr. 17, 2015.

Hereinafter, general aspects of implementation of the systems, devices, and methods of the invention will be described.

The system of the invention or portions of the system of the invention may be in the form of a "processing component," such as a general purpose computer, for example. As used herein, the term "processing component" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit), a Reduced Instruction Set Computer (RISC) or other integrated circuit, a logic circuit, a digital signal processor, a programmable logic device such as a FPGA, PLD, PLA or PAL, or any other device or arrangement of devices that is capable of implementing the steps of the processes of the invention. Any or all of these processing machines may be implemented in a variety of devices, such mobile phones/devices, landline telephones, hearing aids, personal amplification devices, assistive listening devices, video and audio conferencing systems, voice over IP devices, streaming radio devices, two-way radios, tablet computers, desktop and notebook computers, workstations, electronic reading devices, etc.

The processing machine used to implement the invention may utilize a suitable operating system. Thus, embodiments of the invention may include a processing machine running the iOS operating system, the OS X operating system, the Android operating system, the Microsoft Windows™ 10 operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same physical or geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its embodiments, it is to be understood that this invention is only illustrative and exemplary of the present invention and is made to provide an enabling invention of the invention. Accordingly, the foregoing invention is not intended to be construed or to limit the present invention or otherwise to exclude any other such embodiments, adaptations, variations, modifications or equivalent arrangements.

What is claimed is:

1. A method for processing a sound element, comprising:
    at least one computer processor in an audio processing device outputting a first sound element to an audio output device;
    the at least one computer processor receiving, from a signaling unit, user feedback in response to the output of the first sound element;
    the at least one computer processor selecting a processing strategy or technique in response to the user feedback; and
    the at least one computer processor applying the processing strategy or technique to a second sound element.

2. The method of claim 1, wherein the first sound element comprises at least one of a continuant sound element and a non-continuant sound element.

3. The method of claim 1, wherein the processing strategy or technique increases a duration of the second sound element.

4. The method of claim 1, wherein the processing strategy or technique decreases a duration of the second sound element.

5. The method of claim 1, further comprising:
    the at least one computer processor outputting the processed first sound element to the audio output device.

6. The method of claim 1, wherein the first sound element is a speech sound.

7. The method of claim 1, wherein the audio processing device comprises the at least one computer processor and the audio output device.

8. The method of claim 1, wherein the first speech element is received as part of a speech signal.

9. The method of claim 1, wherein the signaling unit is a body-worn device.

10. The method of claim 1, wherein the signaling unit is a handheld device.

11. The method of claim 1, wherein the processing strategy or technique reduces inter-segment masking.

12. The method of claim 1, wherein the processing strategy or technique reduces reverberant masking.

13. The method of claim 1, wherein the processing strategy or technique reduces background noise.

14. The method of claim 1, wherein the processing strategy or technique reduces acoustic feedback.

15. A method for processing a speech signal, comprising:
    at least one computer processor in an audio processing device receiving an audio signal comprising an incoming speech signal;
    the at least one computer processor recognizing an acoustic environment for the audio signal;
    the at least one computer processor selecting a sound element in the received speech signal to process;
    the at least one computer processor determining a signal processing strategy or technique for processing the sound element based on the acoustic environment;
    the at least one computer processor applying the determined signal processing strategy or technique to the selected sound element;
    the at least one computer processor outputting a processed speech signal comprising the processed sound element to an audio output device;
    the at least one computer processor receiving, from a signaling unit, user feedback in response to the output of the processed sound element; and
    the at least one computer processor altering the signal processing strategy or technique based on the user feedback.

16. The method of claim 15, wherein the signaling unit is a handheld device.

17. The method of claim 15, wherein the feedback is received as audible feedback from a user.

18. The method of claim 15, wherein the determined signal processing strategy or technique reduces inter-segment masking.

19. The method of claim 15, wherein the determined signal processing strategy or technique reduces reverberant masking.

20. The method of claim 15, wherein the determined signal processing strategy or technique reduces background noise.

21. The method of claim 15, wherein the determined signal processing strategy or technique reduces acoustic feedback.

22. The method of claim 15, wherein the sound element is a speech sound.

23. The method of claim 15, wherein the step of outputting a processed speech signal comprising outputting a first portion of the processed speech signal to a first channel of the audio output device, and outputting a second portion of the processed speech signal to a second channel of the audio output device.

24. The method of claim 15, wherein the signaling unit is a body-worn device.

25. An audio processing device, comprising:
an audio input device that receives an incoming speech signal that comprises a plurality of sound elements;
an audio output device; and
at least one computer processor that performs the following:
outputs a first sound element to the audio output device;
receives from a signaling unit, user feedback in response to the output of the first sound element;
selects a processing strategy or technique in response to the the user feedback;
applies the processing strategy or technique to a second sound element; and
applies the processing strategy or technique to a second sound element.

26. The audio processing device of claim 25, wherein the audio output device is a speaker.

27. The audio processing device of claim 25, wherein the audio input device is a microphone.

28. The audio processing device of claim 25, wherein the audio input device, the at least one computer processor, and the audio output device are co-located within the same device.

29. The audio processing device of claim 25, wherein the audio output device and the at least one computer processor are separate.

30. The audio processing device of claim 25, wherein at least one of the first sound element and the second sound element is a speech sound.

31. The audio processing device of claim 25, wherein the signaling unit is a body-worn device.

32. The audio processing device of claim 25, wherein the signaling unit is a handheld device.

33. The audio processing device of claim 25, wherein the at least one computer processor outputs the processed first sound element to the audio output device.

34. An audio processing device, comprising:
an audio input device that receives an audio signal comprising an incoming speech signal;
an audio output device; and
at least one computer processor that performs the following:
recognizes an acoustic environment for the audio signal;
select a sound element in the received speech signal to process;
determines a signal processing strategy or technique for processing the sound element based on the acoustic environment;
applies the determined signal processing strategy or technique to the sound element;
output a processed speech signal comprising the processed sound element to the audio output device;
receives, from a signaling unit, user feedback in response to the output of the processed sound element; and
alters the signal processing strategy or technique based on the user feedback.

35. The audio processing device of claim 34, wherein the audio input device is a microphone.

36. The audio processing device of claim 34, wherein the audio input device, the at least one computer processor, and the audio output device are co-located within the same device.

37. The audio processing device of claim 34, wherein the audio output device and the at least one computer processor are separate.

38. The audio processing device of claim 34, wherein the sound element is a speech sound.

39. The audio processing device of claim 34, wherein the audio output device is a speaker.

40. The audio processing device of claim 34, wherein the signaling unit is a body-worn device.

41. The audio processing device of claim 34, wherein the signaling unit is a handheld device.

* * * * *